(12) United States Patent
Katayama

(10) Patent No.: US 7,733,889 B2
(45) Date of Patent: Jun. 8, 2010

(54) NETWORK SWITCHING DEVICE AND METHOD DIVIDING PACKETS AND STORING DIVIDED PACKETS IN SHARED BUFFER

(75) Inventor: Taul Katayama, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 961 days.

(21) Appl. No.: 11/082,831

(22) Filed: Mar. 18, 2005

(65) Prior Publication Data

US 2005/0163141 A1 Jul. 28, 2005

Related U.S. Application Data

(63) Continuation of application No. PCT/JP03/00436, filed on Jan. 20, 2003.

(51) Int. Cl.
  *H04L 12/56* (2006.01)
  *H04L 12/28* (2006.01)
(52) U.S. Cl. ............... 370/412; 370/429; 711/100; 711/147; 711/205
(58) Field of Classification Search ............... None
  See application file for complete search history.

(56) References Cited

U.S. PATENT DOCUMENTS

| | | | |
|---|---|---|---|
| 5,394,397 A | | 2/1995 | Yanagi et al. |
| 5,530,806 A | * | 6/1996 | Condon et al. ............. 714/49 |
| 5,950,231 A | | 9/1999 | Nichol |
| 6,018,763 A | * | 1/2000 | Hughes et al. ............. 709/213 |
| 6,493,347 B2 | * | 12/2002 | Sindhu et al. ............. 370/401 |
| 2002/0054602 A1 | * | 5/2002 | Takahashi et al. ............. 370/412 |
| 2002/0089933 A1 | | 7/2002 | Giroux et al. |
| 2003/0140196 A1 | * | 7/2003 | Wolrich et al. ............. 711/118 |
| 2004/0034743 A1 | * | 2/2004 | Wolrich et al. ............. 711/132 |
| 2006/0143541 A1 | * | 6/2006 | Kay ............. 714/42 |

OTHER PUBLICATIONS

Patent Abstracts of Japan, Publication No. 05-276189, Published Oct. 22, 1993.
Patent Abstracts of Japan, Publication No. 06-164641, Published Jun. 10, 1994.
Patent Abstracts of Japan, Publication No. 10-098475, Published Apr. 14, 1998.
Patent Abstracts of Japan, Publication No. 10-247924, Published Sep. 14, 1998.
Patent Abstracts of Japan, Publication No. 11-122257, Published Apr. 30, 1999.

(Continued)

*Primary Examiner*—Chirag G Shah
*Assistant Examiner*—Salvadore E Rivas
(74) *Attorney, Agent, or Firm*—Fujitsu Patent Center

(57) ABSTRACT

A network switching device that prevents its shared buffer from suffering a blocking problem, while achieving a higher memory use efficiency in buffering variable-length packets. Every received packet is divided into one or more fixed-length data blocks and supplied to the buffer. Under the control of a buffer controller, a transmit queue is created to store up to a fixed number of data blocks for each different destination network, and the data blocks written in the buffer are registered with a transmit queue corresponding to a given destination. The linkage between data blocks in each packet, as well as the linkage between packets in each transmit queue, is managed as a linked list structure based on the locations of data blocks in the buffer.

20 Claims, 16 Drawing Sheets

OTHER PUBLICATIONS

Patent Abstracts of Japan, Publication No. 2000-299701, Published Oct. 24, 2000.
Patent Abstracts of Japan, Publication No. 2002-152247, Published May 24, 2002.
Patent Abstracts of Japan, Publication No. 2002-185495, Published Jun. 28, 2002.
Int'l Search Report dated May 13, 2003 in priority PCT/JP03/00436.
Japanese Patent Office Action issued on May 30, 2006 in corresponding Japanese Patent Application No. 2004-567119.
"Chinese Office Action", Partial English language translation, mailed Apr. 11, 2008 from CN Patent Office for corresponding CN App. No. 03823911.6.
"Chinese Office Action", Partial English language translation, mailed Aug. 7, 2009 from CN Patent Office for corresponding CN App. No. 03823911.6.

* cited by examiner

NETWORK SWITCHING DEVICE AND METHOD DIVIDING PACKETS AND STORING DIVIDED PACKETS IN SHARED BUFFER

This application is continuing application, filed under 35 U.S.C. §111(a), of International Application PCT/JP2003/000436 filed Jan. 20, 2003.

BACKGROUND OF THE INVENTION

1. Field of the Invention

The present invention relates to a network switching device and a network switching method for transferring variable-length packets between a plurality of networks. More particularly, the present invention relates to a network switching device and a network switching method using a shared buffer as temporary packet storage.

2. Description of the Related Art

Network switching devices are often used to interconnect many network segments, as in the Internet and other large-scale networks. The most widely used are those with an internal buffer to temporarily store received packets and inspect their integrity of the received packets before directing them to intended destination ports. This type of switching mechanism is called "store and forward" switching. In many of today's communications network systems, data is transmitted in the form of variable-length packets. According to, for example, the Internet Protocol (IP), a variable-length packet called "IP datagram" carries each message over the network.

FIG. 15 shows an example of a conventional network switching device. The illustrated network switching device transfers packets to and from a plurality of networks 201 to 204. To this end, the device has a plurality of receive interfaces 211 to 214 and their corresponding receive buffers 221 to 224 for reception from different networks 201 to 204, a plurality of transmit interfaces 231 to 234 and their corresponding transmit buffers 241 to 244 for transmission to different networks 201 to 204, and a data transfer circuit 250. To aid the understanding, FIG. 15 shows the receive interfaces 211 to 214 as separate elements from transmit interfaces 231 to 234, although those two sets of interfaces may actually be unified.

The receive interfaces 211 to 214 are connected to different networks 201 to 204, respectively, as are the transmit interfaces 231 to 234. Packets that those receive interfaces 211 to 214 have received from their attached networks 201 to 204 are temporarily stored in the corresponding receive buffers 221 to 224. The data transfer circuit 250 retrieves packets stored in the receive buffers 221 to 224 and routes each packet to an appropriate transmit buffer corresponding to the destination port of that packet. Then the packets stored in each transmit buffer 241 to 244 are read out in response to a transmission request from the corresponding transmit interface 231 to 234 for transmission to the intended networks 201 to 204.

A drawback of the network switching device shown in FIG. 15 is that the device demands a large memory capacity since it has to reserve a number of buffer areas in its memory space to provide a dedicated buffer for each receive port and transmit port. Another known network switching device addresses this problem in memory capacity by providing a single shared buffer to accommodate all incoming and outgoing packets. The following will discuss the network switching device of this type.

FIG. 16 shows an example of a conventional network switching device with a shared buffer. Similar to that of FIG. 15, the network switching device of FIG. 16 transfers packets between a plurality of networks 301 to 304. To this end, the network switching device has the following elements: receive interfaces 311 to 314 corresponding to different networks 301 to 304, transmit interfaces 321 to 324 corresponding to different networks 301 to 304, a receive data transfer circuit 330 for handling incoming packets, a transmit data transfer circuit 340 for handling outgoing packets, and a shared buffer 350 for storing the both. To aid the understanding, FIG. 16 shows two data transfer circuits 330 and 340 as separate elements, although the receiving circuit and sending circuit can be unified in the actual implementation. This applies also to the receive interfaces 311 to 314 and transmit interfaces 321 to 324.

The receive interfaces 311 to 314 receive packets from their corresponding networks 301 to 304. The receive data transfer circuit 330 save them in the shared buffer 350 successively. Upon receipt of a transmission request from each transmit interface 321 to 324, the transmit data transfer circuit 340 delivers packets from the shared buffer 350 to an appropriate transmit interface corresponding to the destination of each packet. The transmit interfaces 321 to 324 output those packets from the shared buffer 350 to their attached networks 301 to 304.

The network switching devices described in FIGS. 15 and 16 are usually designed to manage outbound packets for each particular destination port by using a queue with a linked list structure in which the pending packets are linked one after another. To store variable-length packets, many such buffers are configured to handle data in units of the maximum packet length and to manage individual packets by using pointers. One advantage of this architecture is its ease of control. For example, a packet received with errors can be discarded easily by simply deleting a pointer to that packet. Nevertheless, the buffer consumes large amounts of memory space, which equals the maximum packet length multiplied by the maximum number of packets to be stored. Suppose now that most received packets are far smaller than the assumed maximum packet length. In this case, a large portion of the buffer remains unused, meaning that the memory efficiency decreases.

There has therefore been a demand for a packet switch with an improved common buffer memory architecture that can handle variable-length packets more efficiently. In one example of such a packet switch, variable-length packets received from each input channel are written into a common buffer memory in the form of fixed-length data blocks. A buffer controller is employed to create an input queue for each input channel during the process of writing data blocks. After the last data block is registered with the input queue, the linked address list of that input queue is linked to an output queue corresponding to the specified destination channel.

Input queues are created in the process of writing packets into the common buffer memory, by placing, in a next address memory, a record of the write address of each next fixed-length data block. Output queues, on the other hand, are formed as address tables containing "next read address" indicating which data block to read next, together with "last read address" indicating where the last data block is. The buffer controller has an input queue controller which establishes a linkage from an input queue to an output queue by transporting the addresses of top and last data blocks of each variable-length packet, respectively, to the next and last read addresses in an address table corresponding to the destination channel. If the address table has a registered last read address for a preceding variable-length packet, the input queue controller makes access to the next address memory to extract therefrom the write address of the top data block of a succeeding variable-length packet. The input queue controller then creates a linkage from the extracted address to the existing last read address. By controlling the common buffer memory in this way, the above-described packet switch increases switching speeds, besides improving the efficiency of memory usage. See, for example, paragraphs 0025 to 0040 and FIG. 3 of Japanese Unexamined Patent Publication No. 2002-152247.

There is another example of a packet switch with a common buffer memory storing variable-length packets as a collection of fixed-length data blocks. Similarly to the foregoing example, the buffer controller in this packet switch creates an input queue for each individual input channel to store data in the buffer memory. After the last data block is registered with the input queue, the linked address list of that input queue is linked to an output queue corresponding to the specified destination channel. Unlike the foregoing, this packet switch has a waiting buffer and an address memory that serve as an output queue. The waiting buffer temporarily stores write addresses of top and last data blocks of each variable-length packet. The address memory stores next read addresses indicating which data block to read next, together with last read addresses indicating where the last data block is. The buffer controller has an input queue controller and an output queue controller. The input queue controller registers the write addresses of top and last data blocks of each received variable-length packet with a waiting buffer corresponding to the specified destination channel. When the accompanying address memory is emptied, the output queue controller retrieves a pair of addresses from the waiting buffer and sends them to the address memory as the next and last read addresses of a new set of data blocks. In this way, the packet switch increases switching speeds, besides improving the efficiency of buffer memory usage. See, for example, paragraphs 0025 to 0037 and FIG. 3 of Japanese Unexamined Patent Publication No. 2002-185495.

The network switching device with a shared buffer explained in FIG. 16 may experience a concentrated traffic of incoming packets destined to a particular port. Due to the resulting congestion, the shared buffer could be occupied by outgoing packets addressed to the same port. In this situation, some other ports could suffer a decrease of throughput as a result of congestion inside the shared buffer, although the ports are supposed to work independently of each other. This problem is generally known as "blocking."

The network switching device of FIG. 15 is free from the blocking problem described above, because of its independent receive and transmit buffers disposed for each port. However, as mentioned earlier, the problem with this configuration is that a large buffer capacity is required, and it leads to an increased component cost.

The packet switches disclosed in the aforementioned Japanese Unexamined Patent Publication Nos. 2002-152247 and 2002-185495 make it possible to improve the use efficiency of their common buffer memory in storing received variable-length packets. Those devices, however, lack the ability to avoid a blocking problem.

SUMMARY OF THE INVENTION

In view of the foregoing, it is an object of the present invention to provide a network switching device that prevents its shared buffer from suffering a blocking problem, while achieving a higher memory use efficiency in buffering variable-length packets.

It is another object of the present invention to provide a network switching method that prevents its shared buffer from suffering a blocking problem, while achieving a higher memory use efficiency in buffering variable-length packets.

To accomplish the first object stated above, the present invention provides a network switching device that transports variable-length packets between a plurality of networks. This network switching device has, among others, a buffer for shared use as data storage areas for both incoming packets and outgoing packets, and a packet divider that divides a received packet into one or more data blocks with a fixed length and supplies the divided data blocks to the buffer. The network switching device further has a buffer controller that creates a transmit queue for each destination network to store up to a fixed number of data blocks. This buffer controller also registers the received packet with one of the transmit queues that corresponds to a given destination of the received packet after writing the divided data blocks into the buffer. The buffer controller manages the linkage between data blocks in each packet, as well as the linkage between packets in each transmit queue, as a linked list structure based on the locations of registered data blocks in the buffer.

To accomplish the second object stated above, the present invention provides a network switching method for transferring variable-length packets between a plurality of networks by using a buffer to store and forward the packets. This method includes the following steps: (a) dividing a packet into one or more data blocks with a fixed length for storage in the buffer; (b) creating a transmit queue for each destination network to store up to a fixed number of data blocks; (c) registering the packet with one of the transmit queues that corresponds to a given destination of the packet after the divided data blocks are written into the buffer; and (d) managing linkage between the data blocks within each packet, as well as linkage between packets in each transmit queue, as a linked list structure based on locations of data blocks in the buffer.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
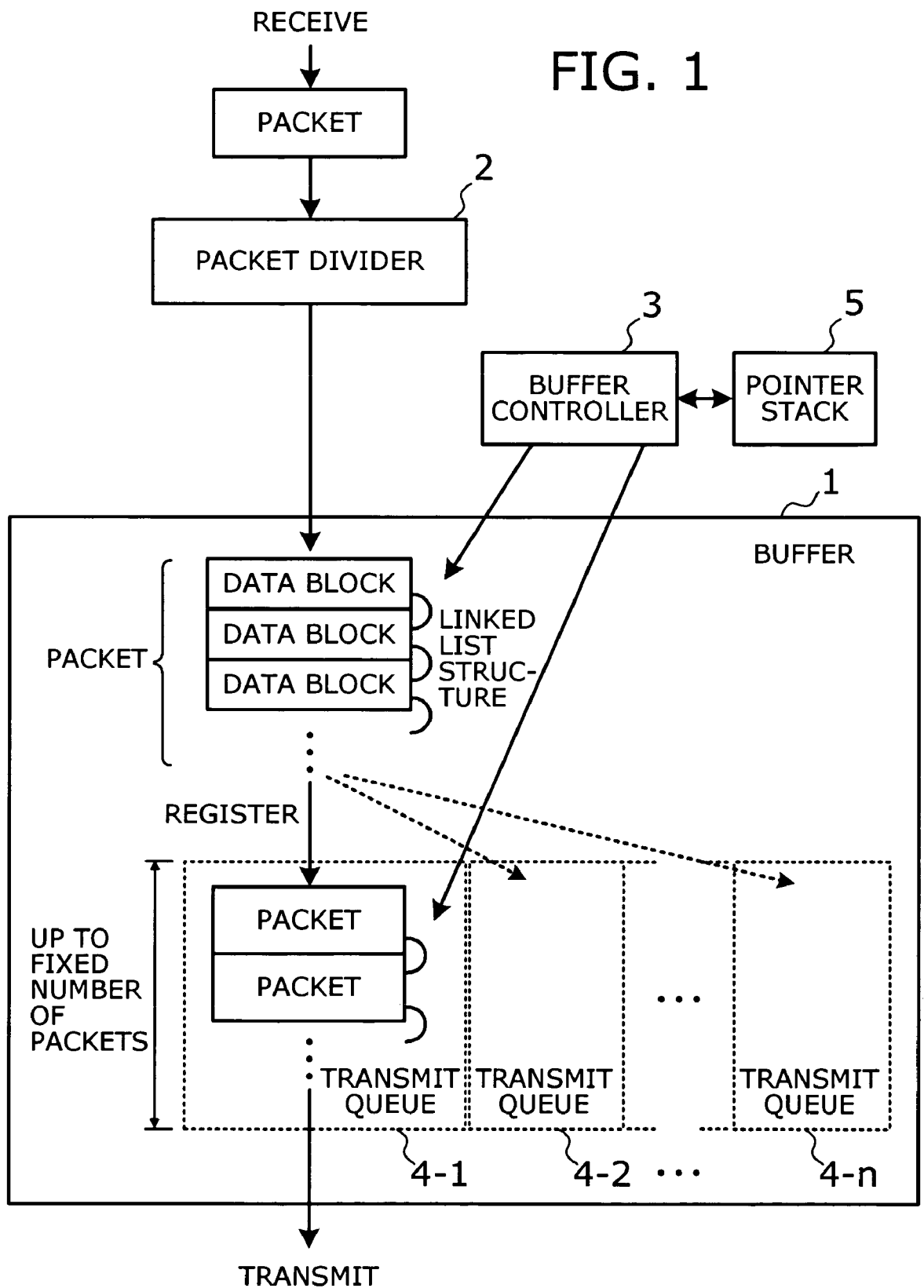
FIG. 1 is a conceptual view showing the principle of the present invention.

Preferred embodiments of the present invention will be described below with reference to the accompanying drawings, wherein like reference numerals refer to like elements throughout.

FIG. 1 is a conceptual view that shows the principle of the present invention. The network switching device of the present invention is connected to a plurality of networks where messages are communicated in the form of variable-length packets, so that the device transports packets between those networks. As shown in FIG. 1, this network switching device has a buffer 1, a packet divider 2, and a buffer controller 3.

The buffer 1 is a storage device (e.g., semiconductor memory) for storing received packets. The packet divider 2 divides each received packet into one or more fixed-length data blocks and supplies them to the buffer 1. This means that one data block is smaller than the maximum data size that a single packet allows. The buffer controller 3 controls read and write operations to data blocks in the buffer 1. With data blocks divided by the packet divider 2, the buffer controller 3 creates a plurality of transmit queues 4-1 to 4-$n$ ($n$: integer greater than one) each corresponding to a particular destination network. After writing data blocks of a packet to the buffer 1, the buffer controller 3 registers that packet with one of the transmit queues that is relevant to the destination of the packet. Each transmit queue 4-1 to 4-$n$ is designed to accept registration entries of a fixed number of data blocks. In a typical implementation the buffer 1 would provide equally-sized storage spaces for those transmit queues 4-1 to 4-$n$ corresponding to different destination networks.

The buffer controller 3 manages data blocks stored in the buffer 1 by using a linked list structure that indicates the storage location of each data block within the buffer 1. Specifically, the following description assumes that the buffer controller 3 has a pointer stack 5 that stores a collection of pointers giving write addresses of the buffer 1. When writing data blocks, the buffer controller 3 pops pointers from the pointer stack 5 for use in constructing a linked list structure.

The above-described network switching device operates as follows. Upon receipt of a packet from a certain network, the packet divider 2 divides this packet into fixed-length data blocks. The resulting data blocks are then stored in the buffer 1 under the control of the buffer controller 3. Specifically, the buffer controller 3 pops a pointer from the pointer stack 5 each time it writes a data block, and uses that pointer to specify the write address of the data block. The buffer controller 3 uses those pointers to manage the original packet in the form of a linked list structure of divided data blocks.

When all data blocks of a packet are entered to the buffer 1, the buffer controller 3 registers the packet with one of the transmit queues 4-1 to 4-$n$ that corresponds to the destination of that packet. Here, the buffer controller 3 manages the linkage between packets registered in each transmit queue 4-1 to 4-$n$ as a linked list structure of their pointers.

The registered data blocks are read out of each transmit queue 4-1 to 4-$n$ in a sequential manner for transmission to the intended destination network. Since the registered data blocks and packets in each transmit queue 4-1 to 4-$n$ are managed as a linked list structure of pointers, the original packet can easily be reconstructed by reading its constituent data blocks from storage locations that the pointers indicate.

As can be seen from the above explanation, the proposed network switching device forms a plurality of transmit queues 4-1 to 4-$n$ that can accommodate a fixed number of data blocks for each different destination network. Every received packet, or data blocks thereof, is written in the buffer 1 and registered with an appropriate transmit queue that is determined from the destination of the packet. These processing steps permit the buffer 1 to serve as a single unified packet storage area for all source and destination networks. Since the capacity of each transmit queue 4-1 to 4-$n$ is dedicated to the corresponding destination network, concentration of packets to a particular destination would never affect the packet transmission to other destinations, despite the fact that all attached networks share the same buffer 1. While serving as a common packet storage area, the buffer 1 prevents a blocking problem from happening.

As described above, every received packet is written in the buffer 1, divided into one or more fixed-length data blocks, each being smaller than the maximum packet size allowed by the attached networks. At the same time, the linkage between data blocks in each packet, as well as the linkage between packets in each transmit queue 4-1 to 4-$n$, is managed as a linked list structure based on the locations of data blocks in the buffer 1. This management technique reduces the amount of memory areas remaining unused in the buffer 1, thus increasing the efficiency of buffer space usage. Accordingly, the present invention eliminates the need for extra buffer space and reduces the required cost of buffer components.

The transmit queues 4-1 to 4-$n$ have a set limit for the number of data blocks that they can accommodate. If new incoming data blocks cause the transmit queue to exceed the limit, the buffer controller 3 may discard the packet containing those excessive data blocks at that point of registration. The number of data block entries in each transmit queue 4-1 to 4-$n$ can be counted as the number of pointers that are used for that specific transmit queue.

When a packet is removed from the transmit queues 4-1 to 4-$n$ for transmission or discard purposes, the pointers used for that packet are returned to the pointer stack 5. In this way, the storage of data blocks in the buffer 1 can be controlled efficiently.

Network Switching Device Structure

Figure 2:
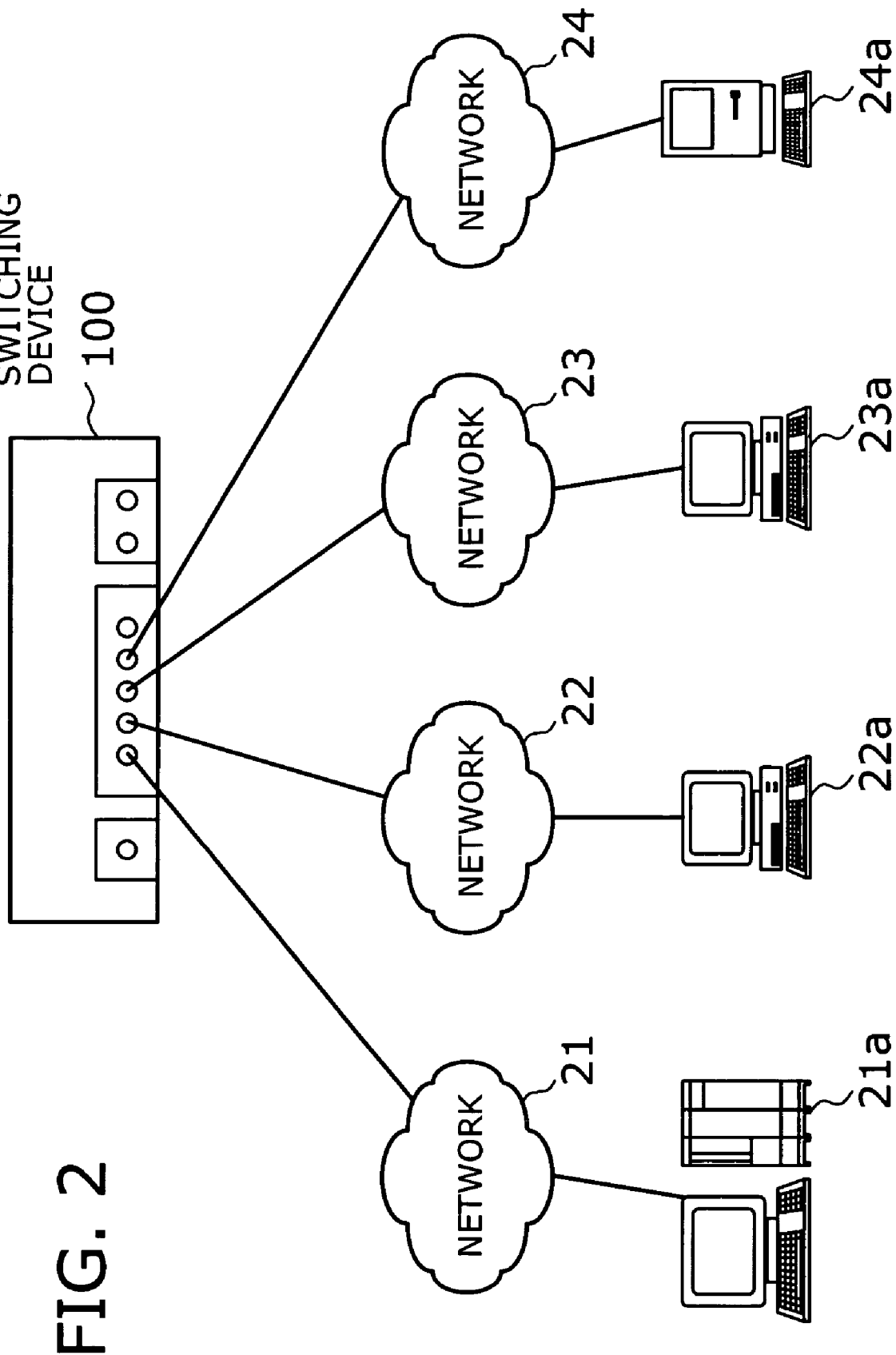
FIG. 2 shows an example of network connection using a network switching device according to an embodiment of the present invention.

The following will now provide the specifics of an embodiment according to the present invention. First, FIG. 2 shows an example of network connection using a network switching device according to an embodiment of the invention. As can be seen, this network switching device 100 has a plurality of communication ports for connection to different networks 21 to 24. Connected locally to the networks 21 to 24 are, for example, terminals 21$a$, 22$a$, 23$a$, and 24$a$. As an alternative configuration, all or part of those terminals 21a to 24a may be connected directly to the network switching device 100.

The network switching device 100 transfers packets between the networks 21 to 24 that are connected to itself. More specifically, packets transmitted from one terminal 21a toward another terminal 22a reach the network switching device 100 through the source network 21. The network switching device 100 delivers these packets to the specified destination network 22, thus permitting the destination terminal 22a on the network 22 to receive them. Note that the network switching device 100 can handle variable-length packets.

Figure 3:
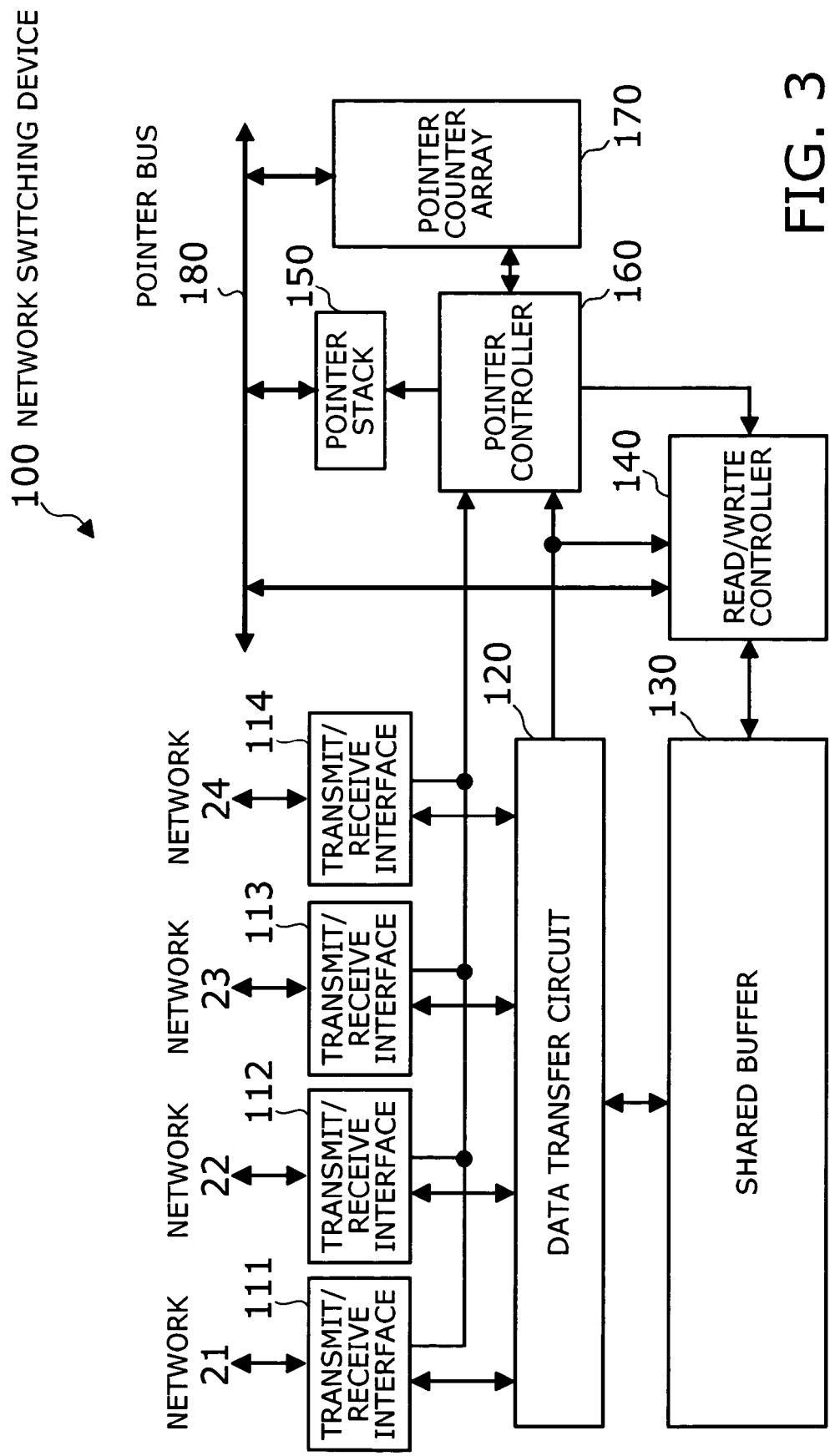
FIG. 3 is a block diagram showing the internal structure of a network switching device according to the embodiment of the present invention.

FIG. 3 is a block diagram showing the internal structure of the network switching device 100. As FIG. 3 shows, the network switching device 100 has the following elements: a plurality of transmit/receive interfaces 111 to 114, a data transfer circuit 120, a shared buffer 130, a read/write controller 140, a pointer stack 150, a pointer controller 160, and a pointer counter array 170. In addition, a pointer bus 180 is provided for some of the above elements to exchange pointers. Specifically, the elements connected to this pointer bus 180 are the read/write controller 140, pointer stack 150, and pointer counter array 170.

The transmit/receive interfaces 111 to 114 are communication interface circuits for sending and receiving data to/from external networks. In the present example, the transmit/receive interfaces 111 to 114 are connected with the networks 21 to 24 (see FIG. 2), respectively.

The transmit/receive interfaces 111 to 114 receive variable-length packets from their corresponding networks 21 to 24 and divides those packets into fixed-length data blocks upon their arrival. At the same time, they request the data transfer circuit 120 to accept the switching of the received packets. When this request is acknowledged, the transmit/receive interfaces 111 to 114 output the divided data blocks to the shared buffer 130 with the assistance of the data transfer circuit 120, together with block location data that indicates whether the outgoing data block is the top block of the packet or last block of the packet or neither of them. The transmit/receive interfaces 111 to 114 also extract information about the packet's destination and send it to the read/write controller 140. In case of a reception error or other problem, they normally send a discard signal to the pointer controller 160, besides actually discarding pertinent packet data.

In parallel with the above, the transmit/receive interfaces 111 to 114 receive transmit data blocks successively from the shared buffer 130 with the assistance of the data transfer circuit 120 and transmit them to their destination networks 21 to 24.

The data transfer circuit 120 acknowledges reception of data blocks from the transmit/receive interfaces 111 to 114 in response to a receive request from them and stores the received data blocks in the shared buffer 130. In this reception process, the read/write controller 140 and pointer controller 160 receive a piece of information that indicates from which receive port the data blocks have come and to which transmit port(s) they are going. This information is referred to herein as an "interface description." The interface description also includes the block location data mentioned above, which indicates whether each outgoing data block is the top block of the packet or the last block of same or neither of them.

The data transfer circuit 120 assists the transmit/receive interfaces 111 to 114 in reading out data blocks of a packet successively from the shared buffer 130 in response to a transmit request from each transmit/receive interface 111 to 114, and it sends these successive data blocks to a particular transmit/receive interface through which the destination terminal of that packet can be reached. During this transmission process, the read/write controller 140 checks the destination of each outgoing data block, and when it turns out that there remains only one pending destination, it so notifies the pointer controller 160.

The shared buffer 130 is a buffer memory for temporarily storing data of packets in data block form until they are retransmitted. This shared buffer 130 offers a reserved area for each receive port to store data blocks of a single packet, as well as that for each transmit port to form a transmit queue dedicated to it. Write address and read address of a data block in the shared buffer 130 are specified by the read/write controller 140.

The read/write controller 140 manages write and read operations of data blocks to/from the shared buffer 130. More specifically, to store data blocks in the shared buffer 130, the read/write controller 140 receives from the pointer stack 150 a pointer for each divided data block and specifies the write address of the block, based on that pointer. The pointer received at this time is also supplied to the pointer counter array 170 via the pointer bus 180.

To read data blocks from the shared buffer 130, the read/write controller 140 manages a linked list structure of the pointers used in writing data blocks. It specifies the read address of a data block according to the linkage of pointers. In this process, the read/write controller 140 outputs pointers used in reading data blocks to the pointer counter array 170 through the pointer bus 180.

Another role of the read/write controller 140 is to create transmit queues in the shared buffer 130, one for each transmit port. Every transmit queue is configured to accommodate a fixed number of data blocks. After storing data blocks of a received packet in the shared buffer 130, the read/write controller 140 registers those data blocks with a transmit queue that is relevant to their destination. It also maintains the linkage between existing packets and a new packet by using a linked list structure of pointers corresponding to data blocks that constitute those packets, thus enabling each transmit queue to deliver data blocks to the transmit/receive interfaces 111 to 114 with the assistance of the data transfer circuit 120 successively.

The pointer stack 150 stores pointers that provide write addresses of data blocks in the shared buffer 130. The pointer stack 150 manages those write address pointers in a unified manner for all packet storage areas in the shared buffer 130, thus permitting efficient use of shared buffer space.

Suppose that a packet received at one of the transmit/receive interfaces 111 to 114 is to be entered into the shared buffer 130 in the form of divided data blocks. The pointer stack 150 then pops a pointer according to a control signal from the pointer controller 160 and places the popped pointer on the pointer bus 180 for delivery to the read/write controller 140. When, in turn, a data block is read out of the shared buffer 130, the pointer stack 150 receives via the pointer bus 180 a corresponding pointer that has been held in the pointer counter array 170. That is, the used pointer is pushed back onto the pointer stack 150.

The pointer controller 160 controls pop and push operations of pointer stack 150 in connection with transfer of data blocks by the data transfer circuit 120, as well as with reception of packet discard signals. The pointer controller 160 also provides the pointer counter array 170 with control signals to control the process of writing and reading pointers in the pointer counter array 170 through the pointer bus 180.

The pointer counter array 170 has a plurality of counters to manage the pointers pointing to individual data blocks written in the shared buffer 130, as well as other parameters such as the number of pointers used therefor and the number of pointers registered with each transmit queue, separately for each individual receive port and transmit port. As will be described later, the pointer counter array 170 manages the currently used pointers in two groups, one for writing data blocks to the shared buffer 130 and the other for reading data blocks out of the same. When data blocks are transmitted to the specified destination, their pointers become obsolete. Based on control signals from the pointer controller 160, the pointer counter array 170 sends such obsolete (but reusable) pointers back to the pointer stack 150 through the pointer bus 180. Yet another function of the pointer counter array 170 is to count the number of pointers registered with transmit queues. If the number of pointers exceeds a predetermined limit, the pointer counter array 170 issues a discard signal to request the pointer controller 160 to discard the packet that is in process of registration.

With the configuration described above, the network switching device 100 performs packet switching by using a single shared buffer 130. Suppose, for example, that a packet addressed to a destination network 22 has arrived from a source network 21. The packet received by the transmit/receive interface 111 is then divided into fixed-length data blocks and stored in the shared buffer 130 with the assistance of the data transfer circuit 120. Here, the read/write controller 140 gives the write address of each data block in the shared buffer 130 on the basis of a pointer popped from the pointer stack 150.

The read/write controller 140 creates transmit queues in the shared buffer 130, one for each transmit port. After storing data blocks in the shared buffer 130, the read/write controller 140 registers these data blocks with an appropriate transmit queue corresponding to their destination. Here, the read/write controller 140 manages the linkage between data blocks in each packet, as well as the linkage between packets in the transmit queue, by means of linked list structures of pointers. More specifically, a pointer in the transmit queue is set to give a linkage from the last data block of an existing packet to the top data block of a newly registered data block. By successively specifying pointers according to such a linked list structure, a series of stored data blocks are read out of the transmit queue. Those data blocks are then transferred by the data transfer circuit 120 to the transmit/receive interface 112 corresponding to their destination and thus delivered to the intended network 22.

That is, the write addresses of data blocks are provided as pointers, which are centrally managed in the pointer stack 150. Using those pointers popped from the pointer stack 150, the read/write controller 140 manages the linkage between data blocks in the shared buffer 130 as a linked list structure. This management method enables all data contents of different packets to be stored in a single shared buffer 130, regardless of their receive port or transmit port, for the entire process of reception to retransmission to their respective destinations. Also, the proposed method divides a received packet into fixed-length data blocks when storing them in the shared buffer 130. The memory space of the shared buffer 130 is therefore used efficiently, meaning that the shared buffer 130 can be optimized in size.

Further, with the pointer counter array 170, the currently used pointers and their number are managed, as are the number of pointers registered with a transmit queue corresponding to each particular transmit port. This management method makes it easy to control pointers in active use. It also limits the number of data blocks registered with a transmit queue, which, together with the reserved space allocated per each port for receive packets, prevents a blocking problem from happening.

Figure 4:
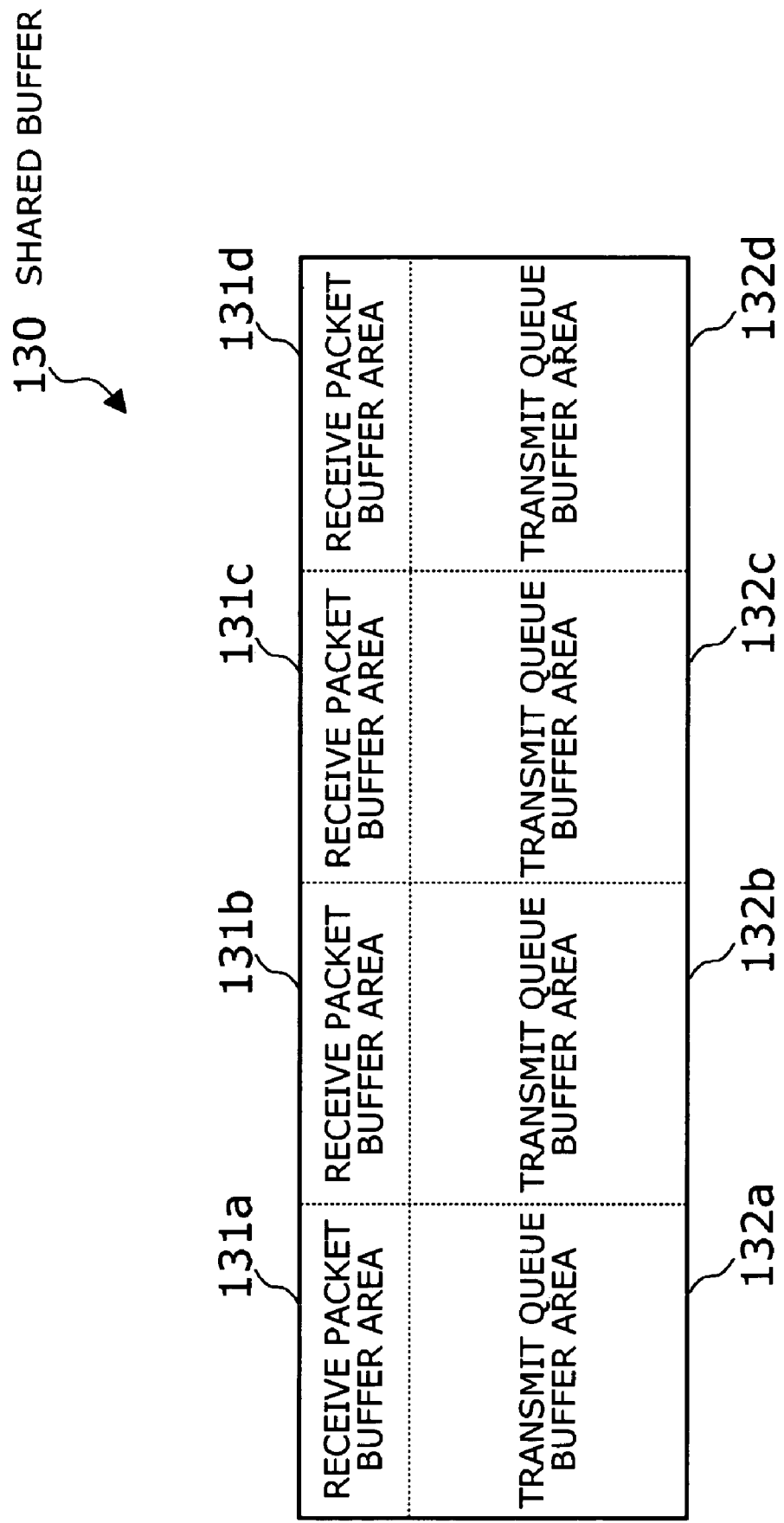
FIG. 4 schematically shows how data is stored in a shared buffer.

FIG. 4 schematically shows how data is stored in the shared buffer 130. As can be seen, a plurality of receive packet buffer areas 131*a* to 131*d* are created in the shared buffer 130, corresponding to different receive ports. Also created in the shared buffer 130 are a plurality of transmit queue buffer areas 132*a* to 132*d* each dedicated to different transmit ports. Note that FIG. 4 only shows logical buffer areas, and that the physical buffer areas may not necessarily be organized in the way shown in FIG. 4.

The receive packet buffer areas 131*a* to 131*d* correspond to different transmit/receive interfaces 111 to 114 so as to store the data blocks created from each packet that the respective transmit/receive interfaces 111 to 114 have received. Likewise, the transmit queue buffer areas 132*a* to 132*d* correspond to different transmit queues serving different packet destinations, so as to store the data blocks registered with the respective transmit queues. Each transmit queue buffer area 132*a* to 132*d* can store a fixed number of data blocks in its limited capacity. The pointer counter array 170 manages the capacity usage of those transmit queue buffer areas 132*a* to 132*d* by counting the number of pointers being used to store data blocks in transmit queues.

Suppose again that a packet addressed to one network 22 has arrived from another network 21. Upon reception, the network switching device 100 first stores data blocks of that packet in the receive packet buffer area 131*a* relevant to the source network 21. When all data blocks are stored, the read/write controller 140 appends those data blocks to a transmit queue corresponding to the packet destination.

Here, the read/write controller 140 manages the linkage between data blocks in that packet, as well as the linkage between packets in the transmit queue, in the form of linked list structures of pointers. Note that the physical location of packet data in the shared buffer 130 does not change at all. Instead, the relevant portion of the receive packet buffer area 131*a* will also serve as part of the transmit queue buffer area 132*b*.

Now that the packet is registered with a transmit queue, its data blocks can be read out of the transmit queue buffer area 132*b* as necessary. This read operation occurs under the control of the read/write controller 140, with the aid of a series of pointers given by a relevant linked list structure. After the packet is read and transmitted, the transmit queue buffer area 132*b* used to store those data blocks is flushed logically by returning the pointers for that area 132*b* back to the pointer stack 150. The emptied transmit queue buffer area 132*b* becomes ready to accommodate a new set of data blocks.

Pointer Controller and Pointer Counter Array

Figure 5:
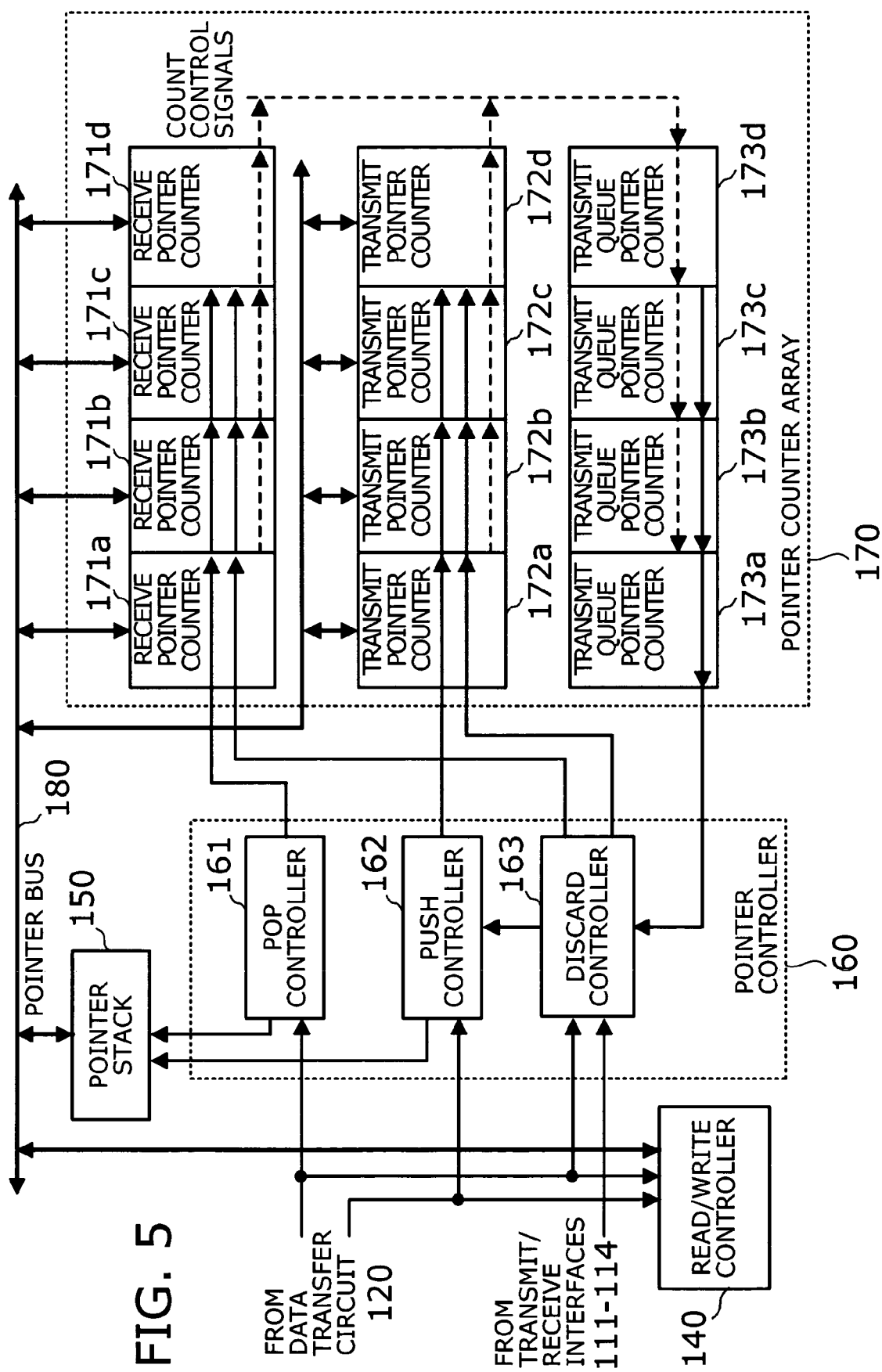
FIG. 5 is a block diagram showing an example internal structure of a pointer controller and a pointer counter array.

This section explains in detail the pointer controller 160 and pointer counter array 170. FIG. 5 is a block diagram showing an example internal structure of the pointer controller 160 and pointer counter array 170. Some surrounding functional blocks are also shown to aid the understanding of how those elements are organized in relation to the pointer controller 160 and pointer counter array 170.

As can be seen from FIG. 5, the pointer controller 160 has a pop controller 161, a push controller 162, and a discard controller 163. The pointer counter array 170 includes receive pointer buffers 171*a* to 171*d* corresponding to different receive ports, and transmit pointer buffers 172*a* to 172*d* and transmit queue pointer counters 173*a* to 173*d* corresponding to different transmit ports.

In the pointer controller 160, the pop controller 161 is activated when there are data blocks that should be transferred to the shared buffer 130. The pop controller 161 then instructs the pointer stack 150 to pop a new pointer. In addition, the pop controller 161 issues a control signal to command a receive pointer buffer associated with the receive port of interest to receive the new pointer.

The push controller 162, on the other hand, is activated when the shared buffer 130 outputs stored data blocks. In this case, the push controller 162 sends a control signal to a transmit pointer buffer associated with the transmit port of interest to return a specified pointer. Another case where the push controller 162 is activated is when transmission of a packet has finished with all the specified destinations. The push controller 162 in this case instructs the pointer stack 150 to push the pointers on the pointer stack 150. After that, the push controller 162 flushes the transmit pointer buffer that has held the pointers during the transmission.

The discard controller 163 is activated when a discard signal is received from either the transmit/receive interfaces 111 to 114 or the transmit queue pointer counters 173a to 173d. It issues a control signal to the pointer stack 150 so that the pointer will be pushed onto the pointer stack 150. The discard controller 163 also sends a control signal to command a relevant receive pointer buffer 171a to 171d or transmit pointer buffer 172a to 172d to output stored pointers. Those control signals from the discard controller 163 are received by a particular receive pointer buffer or transmit pointer buffer that has been instructed to hold pointers or output count control signals.

All receive pointer buffers 171a to 171d and transmit pointer buffers 172a to 172d in the pointer counter array 170 is connected to the pointer bus 180, so that they can send and receive pointers. They are also capable of producing count control signals in order to request a particular transmit queue pointer counter 173a to 173d to increase or decrease the count values.

Based on a control signal from the pop controller 161 in the pointer controller 160, one of the receive pointer buffers 171a to 171d receives popped pointers from the pointer stack 150 through the pointer bus 180. Besides keeping those pointers, the selected receive pointer buffer counts the number of received pointers. When it has received and counted all pointers for one packet, the receive pointer buffer outputs a counter control signal to a transmit queue pointer counter corresponding to the specified transmit port, so that the final count value will be added to that transmit queue pointer counter. After that, the receive pointer buffer clears its count value, besides nullifying, or returning, the pointers at hand.

Control signals from the discard controller 163, on the other hand, cause the receive pointer buffers to output the pointers at hand to the pointer bus 180, when necessary, thereby returning them to the pointer stack 150. The corresponding receive pointer buffer also clears its count value accordingly.

In the process of transmission, a specified transmit pointer buffer 172a to 172d receives pointers supplied from the read/write controller 140 through the pointer bus 180. Besides keeping those pointers, the transmit pointer buffer counts the number of them and outputs counter control signals to a transmit queue pointer counter 173a to 173d corresponding to the same specified transmit port, so that the final count value will be subtracted from that transmit queue pointer counter.

In the case where the packet read out of the shared buffer 130 has only one specified destination, the read/write controller 140 successively outputs pointers used for its data blocks to the pointer bus 180. This means that those pointers are returned to the pointer stack 150. Accordingly, the corresponding transmit pointer buffer clears its count value.

In the case where the packet has other destinations, the transmit pointer buffer outputs a counter control signal to a transmit queue pointer counter corresponding to the specified transmit port, so that the current count value will be added to that transmit queue pointer counter. The transmit pointer buffer does not clear its count value or the pointers at hand, until the above addition is executed.

Control signals received from the discard controller 163, on the other hand, cause the transmit pointer buffer to output the pointers at hand to the pointer bus 180, when necessary, thereby returning them to the pointer stack 150. The transmit pointer buffer also clears its count value accordingly.

The transmit queue pointer counters 173a to 173d count the number of pointers used to register data blocks with the corresponding transmit queues. This counting operation is controlled in accordance with the count control signals provided by a relevant receive pointer buffer 171a to 171d or transmit pointer buffer 172a to 172d. Their count values represent the state of a particular transmit queue. If their count value exceeds a set limit, the transmit queue pointer counters 173a to 173d send a discard signal to the discard controller 163.

Pointer Control Process

The following explains the internal operation of the pointer controller 160 and pointer counter array 170. The explanation starts with a flowchart showing how the pop controller 161 works when a packet has arrived at a receive port.

Figure 6:
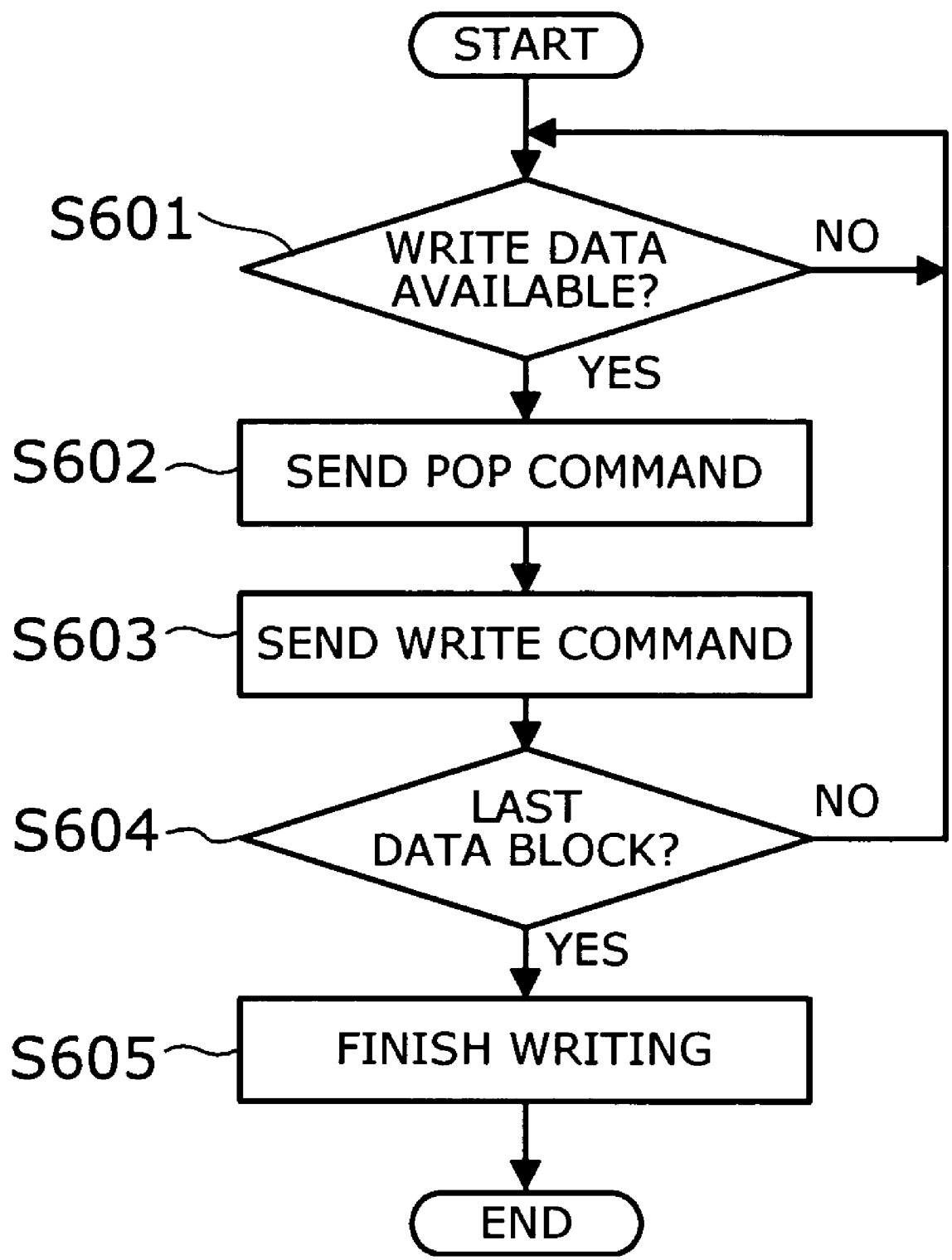
FIG. 6 is a flowchart of a process executed by a pop controller.

FIG. 6 is a flowchart of a process executed by the pop controller 161. This process includes the following steps:

(Step S601) To transfer the received data blocks from a relevant transmit/receive interface 111 to 114 to the shared buffer 130, the data transfer circuit 120 negotiates with the interfaces and determines whether there is a data block to be written into the shared buffer 130. If so, the process advances to step S602.

(Step S602) The pop controller 161 commands the pointer stack 150 to pop a pointer. The popped pointer is delivered to the read/write controller 140 and the pointer counter array 170 through the pointer bus 180.

(Step S603) To load the pointer, the pop controller 161 sends a control signal to a receive pointer buffer corresponding to the specified receive port. This control signal permits the relevant receive pointer buffer to receive the pointer popped from the pointer stack 150. Upon receipt of this new pointer, the receive pointer buffer is incremented accordingly.

(Step S604) Based on the result of the negotiation between the data transfer circuit 120 and receiving interface, the pop controller 161 determines whether the current block is the last data block of the received packet. If it is not, the process returns to step S601. If it is, the process advances to step S605.

As the above steps S601 to S604 are repeated, all the data blocks are entered to the shared buffer 130, and the pointers used in writing those data blocks are stored in the relevant receive pointer buffer. The count value of this receive pointer buffer represents the number of stored pointers.

(Step S605) The pop controller 161 notifies the receive pointer buffer used in the above steps S601 to S604 that no more pointers are coming. This step involves selecting a particular transmit port specified in the interface description and thus informing the receive pointer buffer of that selection. In the case where the interface description specifies two or more transmit ports, the selected transmit port has to agree with what is selected by the read/write controller 140. To fulfil this condition, an appropriate set of rules should be implemented beforehand.

The notified receive pointer buffer now issues a count control signal to add its count value to a transmit queue pointer counter corresponding to the selected transmit port. This permits the relevant transmit queue pointer counter to maintain the number of pointers used in the corresponding transmit queue (i.e., the number of data blocks that are registered with that transmit queue).

The transmit queue pointer counter, however, could exceed a predetermined upper limit as a result of receiving the count control signal described above. If this is the case, it generates a discard signal to the discard controller 163, so that a control signal is sent from the discard controller 163 to activate the push controller 162. The discard controller 163 also sends another control signal requesting the receive pointer buffer to output pointers. The discard controller 163 sends yet another control signal to the read/write controller 140 in order not to register the excessive data blocks with the transmit queue of interest. The exception is that, if the packet has another destination, the transmit queue associated with that destination should accept the registration of data blocks.

Figure 7:
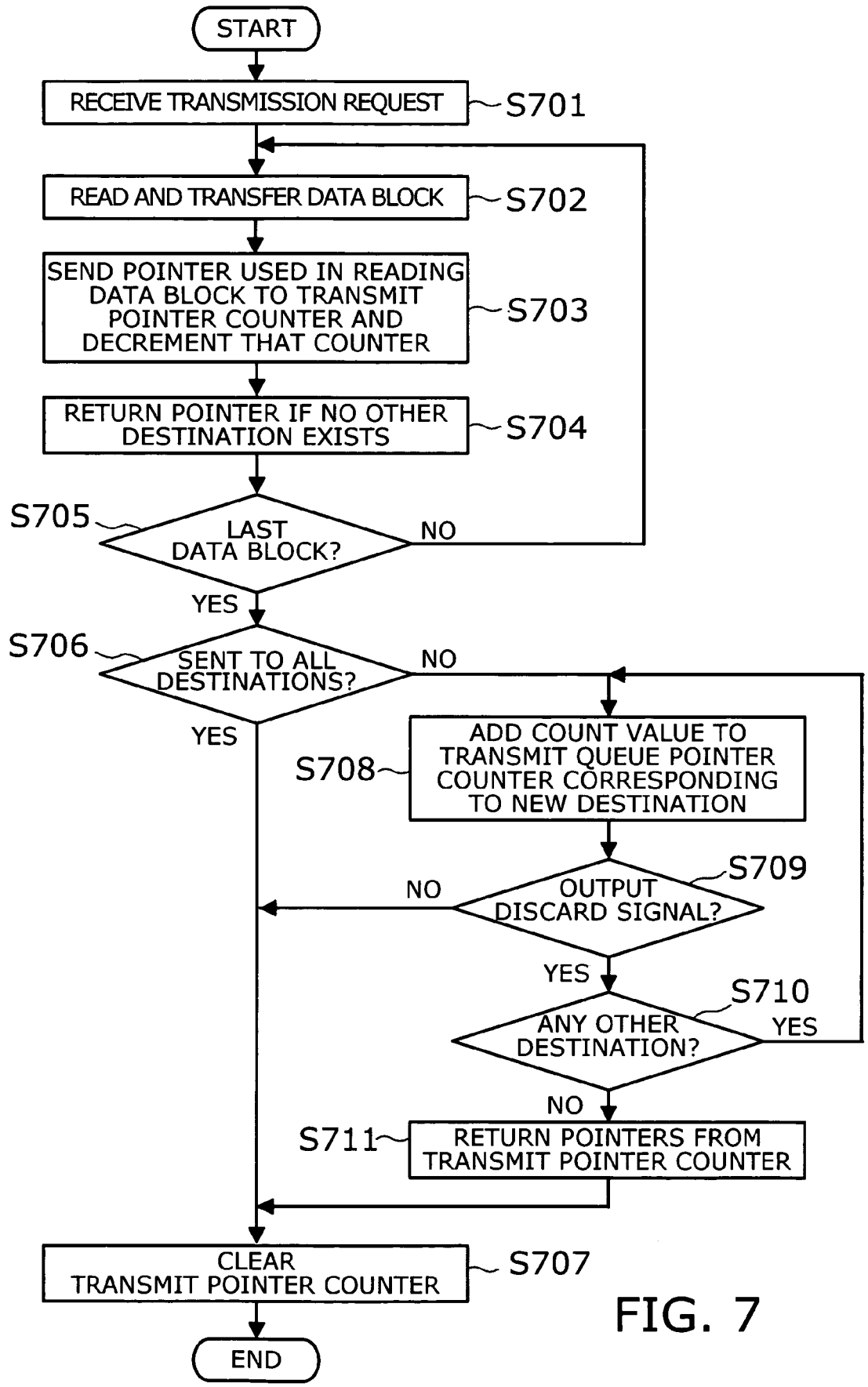
FIG. 7 is a flowchart of a process executed by the network switching device to transmit packets.

Referring next to the flowchart of FIG. 7, the following will explain a process executed by the network switching device 100 when it transmits a packet. This flowchart assumes selection of a particular transmit port through which a packet will be transferred. The process of FIG. 7 includes the following steps:

(Step S701) The data transfer circuit 120 receives a transmission request from a transmit/receive interface.

(Step S702) The data transfer circuit 120 notifies the read/write controller 140 of which transmit port is waiting data blocks. The read/write controller 140 then outputs a read address, allowing a data block to be read out of the relevant transmit queue. The data transfer circuit 120 delivers this data block to a transmit/receive interface corresponding to the destination of the packet.

(Step S703) The read/write controller 140 outputs the pointer used in the reading step S702 to the pointer bus 180. At the same time, a control signal for writing the pointer is issued to a transmission pointer buffer corresponding to the transmit port. With this control signal, the transmission pointer buffer increments itself, besides receiving the pointer from the read/write controller 140. The transmission pointer buffer then issues a count control signal to the corresponding transmit queue pointer counter so as to decrease its count value.

(Step S704) From the content of the data block read out of the transmit queue, the data transfer circuit 120 determines whether the packet has any other destination than the current one. Only when the packet has no extra destinations, the push controller 162 is so notified at this step S704. With this notification, the push controller 162 causes the pointer stack 150 to start a push operation, thus returning the pointer from the read/write controller 140 to the pointer stack 150 via the pointer bus 180.

(Step S705) It is determined whether the data block read out of the transmit queue is the last block of the packet of interest. If not, the process goes back to step S702 to read and transfer the next data block. If it is the last block, the process advances to step S706.

The above steps S701 to S705 are repeated to transmit all data blocks of the packet through a single transmit port. During this process, the pointers used for those data blocks are passed to a transmit pointer buffer corresponding to the transmit port. This transmit pointer buffer counts the number of received pointers, and its final count is subtracted from the transmit queue pointer counter corresponding to the same transmit port.

(Step S706) It is determined whether the packet is sent to all the specified destinations. If it is, the process advances to step S707. If not, the process proceeds to step S708.

(Step S707) The transmit pointer buffer used to store pointers is now cleared, thus terminating the process of transferring data blocks.

(Step S708) Now that the packet has to be sent to some other destinations, transmit port corresponding to the next destination is selected according to the interface description. Then in the pointer counter array 170, a transmit queue pointer counter corresponding to the selected transmit port receives a count control signal, so that it will increase by the count value kept by the transmit pointer buffer corresponding to the transmit port that has just finished transmission of the same packet.

(Step S709) The addition at step S708 could cause the transmit queue pointer counter to exceed its upper limit. If this is the case, it generates a discard signal to the discard controller 163, without executing the addition of the count value. The process then proceeds to step S710. In the case no discard signal is necessitated, the process advances to steps S707, at which the present process terminates itself after clearing the count associated to the transmit pointer buffer corresponding to the transmit port that has just finished transmission.

As a result of the steps S708 and S709, the transmit queue pointer counter corresponding to the next destination of the packet has increased by the count value associated to the transmit pointer buffer for the current destination. The read/write controller 140 then adds a new link to the transmit queue of the next destination, thus registering the same packet with that queue.

(Step S710) It is determined whether there is any other destination. If there is, the process returns to step S708 to allow the data transfer circuit 120 to select another transmit port. If not, the process advances to step S711.

At this step, the discard controller 163 triggers the push controller 162 to start a push operation, in response to the discard signal from the transmit queue pointer counter. The push controller 162 has already been informed by the interface description of whether there is any other destination, and if there is, it is necessary to send the same packet to that destination. In this case, the push controller 162 neglects the above request for a push operation on the pointer stack 150.

(Step S711) Knowing that there is no more destination, the push controller 162 commands the pointer stack 150 to push pointers in response to the request from the discard controller 163. The discard controller 163 has issued a control signal requesting a transmit pointer buffer corresponding to the transmit port that has just finished transmission to output its pointers to the pointer bus 180. In response to this control signal, the transmit pointer buffer places its own pointers on the pointer bus 180, thus returning them to the pointer stack 150. The process then proceeds to step S707 to terminate itself after clearing that transmit pointer buffer.

The steps explained above in FIGS. 6 and 7 enable efficient management of write address of data blocks in the shared buffer 130. For example, when discarding a packet, the pointer controller 160 instructs a relevant receive pointer buffer 171*a* to 171*d* or transmit pointer buffer 172*a* to 172*d* to return pointers to the pointer stack 150. This returning of pointers means that their corresponding areas in the shared buffer 130 are emptied, thus ensuring that succeeding data blocks can be stored in the shared buffer 130 by reusing those pointers.

Since the transmit queue pointer counters 173a to 173d manage the number of data blocks registered with transmit queues, the contents of transmit queue buffer areas 132a to 132d (i.e., data blocks in each transmit queue) are controlled not to exceed their capacity limit. With this mechanism, excessive packets are discarded when, for example, a number of outgoing packets concentrate to a particular transmit port. Accordingly, the congestion with this transmit port would not affect the operation of other transmit ports, thus preventing blocking problems from happening.

The next section describes how the data blocks in the shared buffer 130 are managed with a linked list structure. More specifically, two example methods will be presented, which are referred to as a first linked list management and a second linked list management.

First Linked List Management

According to the first linked list management, the shared buffer 130 offers a space called "auxiliary cell areas" for individual data blocks in addition to data block areas, and the read/write controller 140 uses those areas to create and store some extra information ("auxiliary data") for managing the linkage between data blocks within a packet, as well as the linkage between packets within each transmit queue. Further, the read/write controller 140 has a variety of registers in order to manage the linkage between data blocks for each receive port or transmit port. By rewriting those registers, the read/write controller 140 controls the process of writing and reading data blocks to/from the shared buffer 130.

Figure 8:
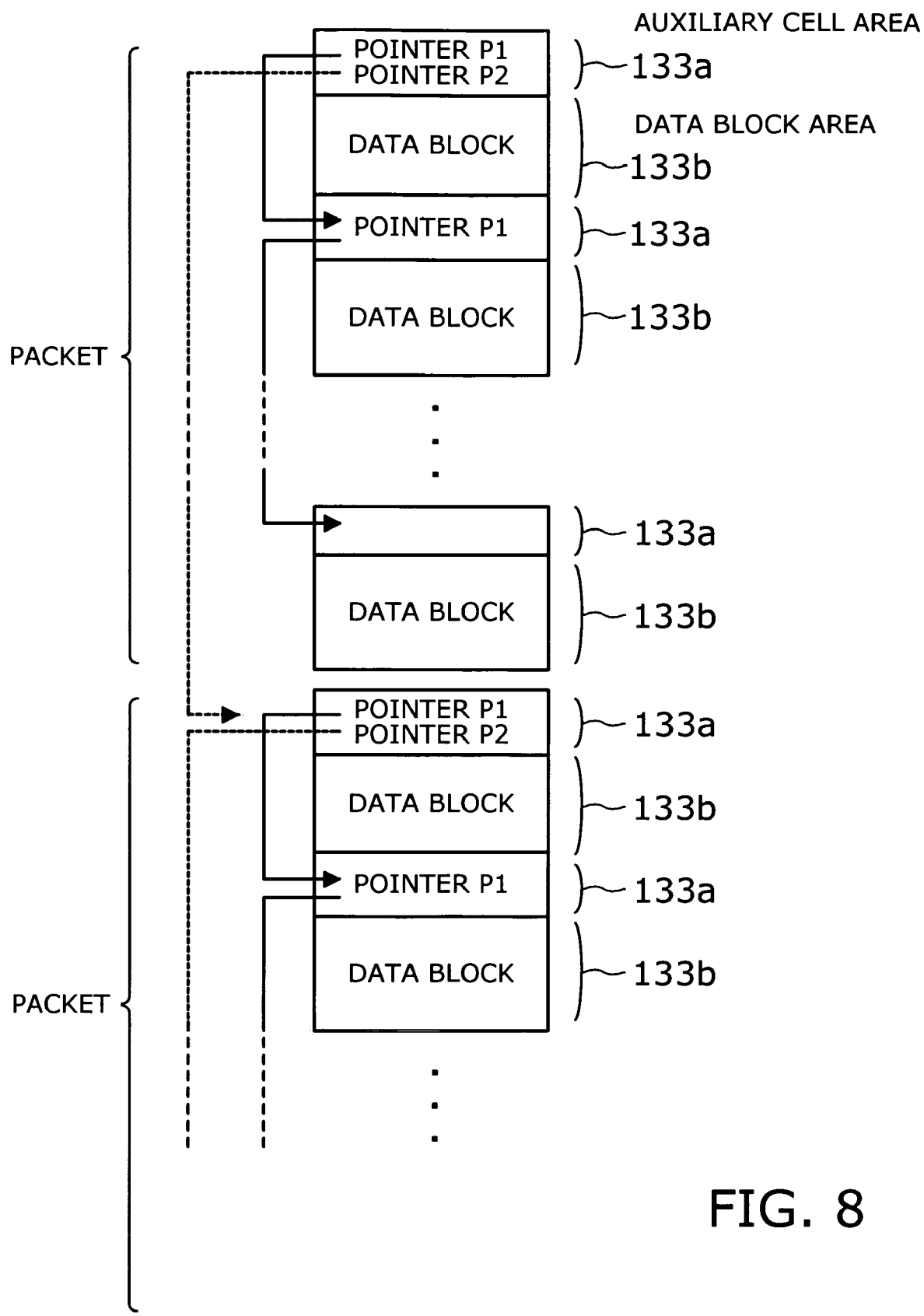
FIG. 8 schematically shows the structure of data blocks stored in a shared buffer according to a first linked list management method.

FIG. 8 schematically shows the structure of data blocks stored in the shared buffer 130. For illustrative purposes, the linked data blocks and packets shown in FIG. 8 are arranged back to back. In the real system, however, the physical locations of data blocks in the shared buffer 130 may not be like this.

Packets received by the transmit/receive interfaces 111 to 114 are each divided into multiple data blocks and stored in different areas of the shared buffer 130 as specified by their respective pointers. Specifically, the storage area for one data block is formed from an auxiliary cell area 133a and a data block area 133b. Each divided data block is stored in the data block area 133b.

Suppose, for example, that a packet addressed to a destination network 22 has arrived from a source network 21. The transmit/receive interface 111 receives this packet and supplies its data blocks to the shared buffer 130 with the assistance of the data transfer circuit 120. These data blocks are directed to the receive packet buffer area 131a in the shared buffer 130 (see FIG. 4). Referring to FIG. 8, the auxiliary cell area 133a of each data block contains a pointer that indicates where the next data block is. FIG. 8 shows this kind of pointers as "Pointer P1." When the received packet is stored entirely, all data blocks except the last one have a pointer P1 in their respective auxiliary cell areas 133a. In this way, data blocks of one packet are linked successively from its top block to last block by means of pointers P1.

Subsequently those data blocks are registered with a transmit queue corresponding to the destination network 22. In this registration process, the read/write controller 140 consults a register array (described later) to identify the last registered packet, if any, in the transmit queue. Another pointer is then set to the auxiliary cell area 133a of the top data block of this last packet, so as to indicate where the top block of the new packet is stored. FIG. 8 shows this pointer as "Pointer P2," which establishes a linkage between packets in the transmit queue.

The read/write controller 140 actually maintains more pointers, as part of the register array, for reading a data block in the transmit queue. Each time it reads out a new data block, the read/write controller 140 looks into the auxiliary cell area 133a of that data block to extract a pointer(s) indicating the location of the next data block. The read/write controller 140 updates the content of the register array with this new pointer value.

Figure 9:
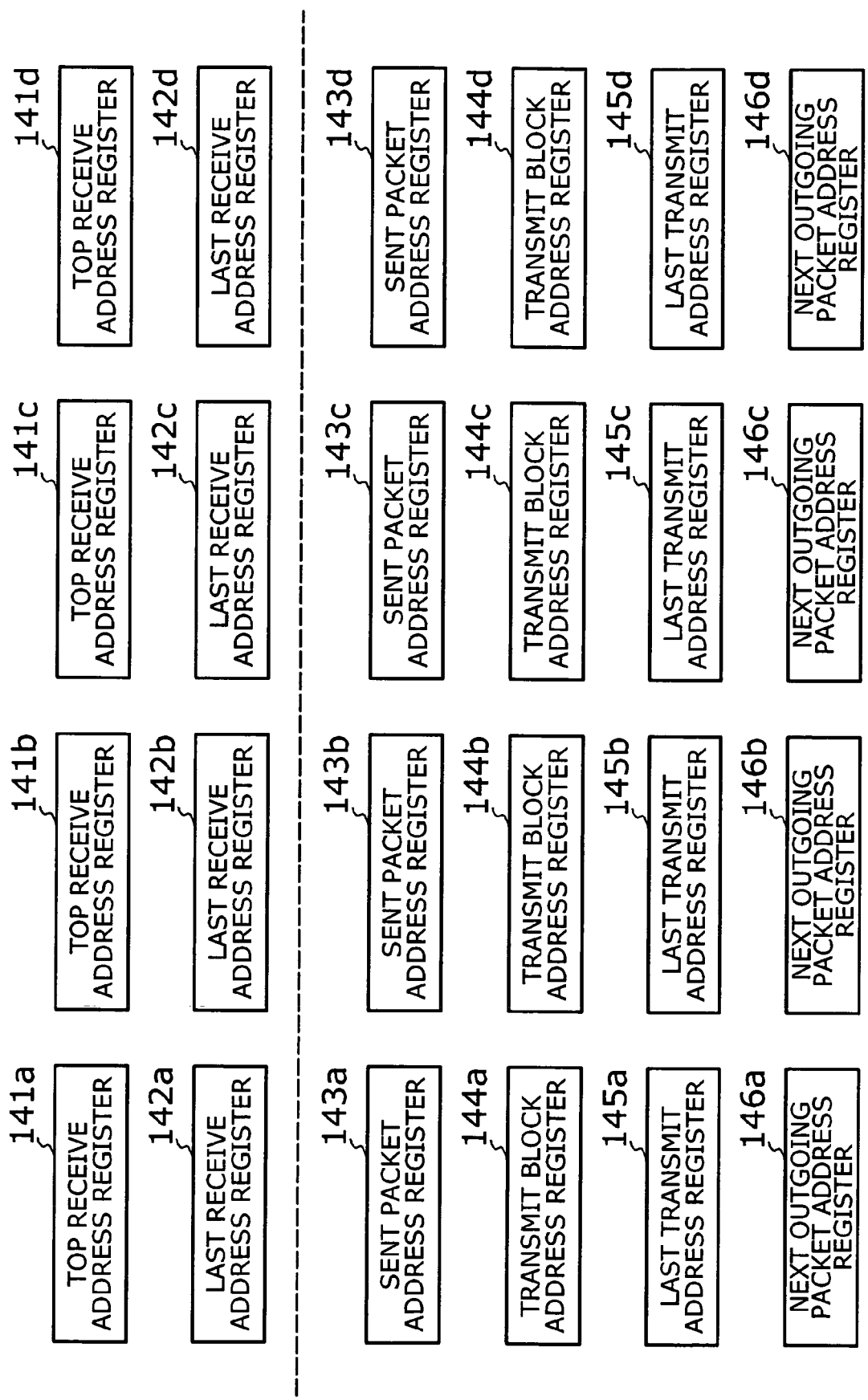
FIG. 9 shows the structure of a register array in a read/write controller according to the first linked list management.

FIG. 9 shows the register array of the read/write controller 140. As can be seen from FIG. 9, the read/write controller 140 has top receive address registers 141a to 141d and last receive address registers 142a to 142d, corresponding to different receive ports. The top receive address registers 141a to 141d hold a pointer to the top data block of a received packet in the shared buffer 130, and their corresponding last receive address registers 142a to 142d hold a pointer to the last data block of that packet.

The read/write controller 140 also has the following registers each corresponding to a different transmit port: sent packet address registers 143a to 143d, transmit block address registers 144a to 144d, last transmit address registers 145a to 145d, and next outgoing packet address registers 146a to 146d. These registers serve as pointers to a particular data block of a particular packet in their corresponding transmit queues created in the shared buffer 130. Specifically, the sent packet address registers 143a to 143d hold a pointer to the top data block of a packet that is being transmitted or is going to be transmitted. The transmit block address registers 144a to 144d hold a pointer to a data block that is to be transmitted next from each transmit queue. The last transmit address registers 145a to 145d hold a pointer to the top data block of the last registered packet in each transmit queue. The next outgoing packet address registers 146a to 146d hold a pointer to the top data block of a packet that is to be transmitted next.

Figure 10:
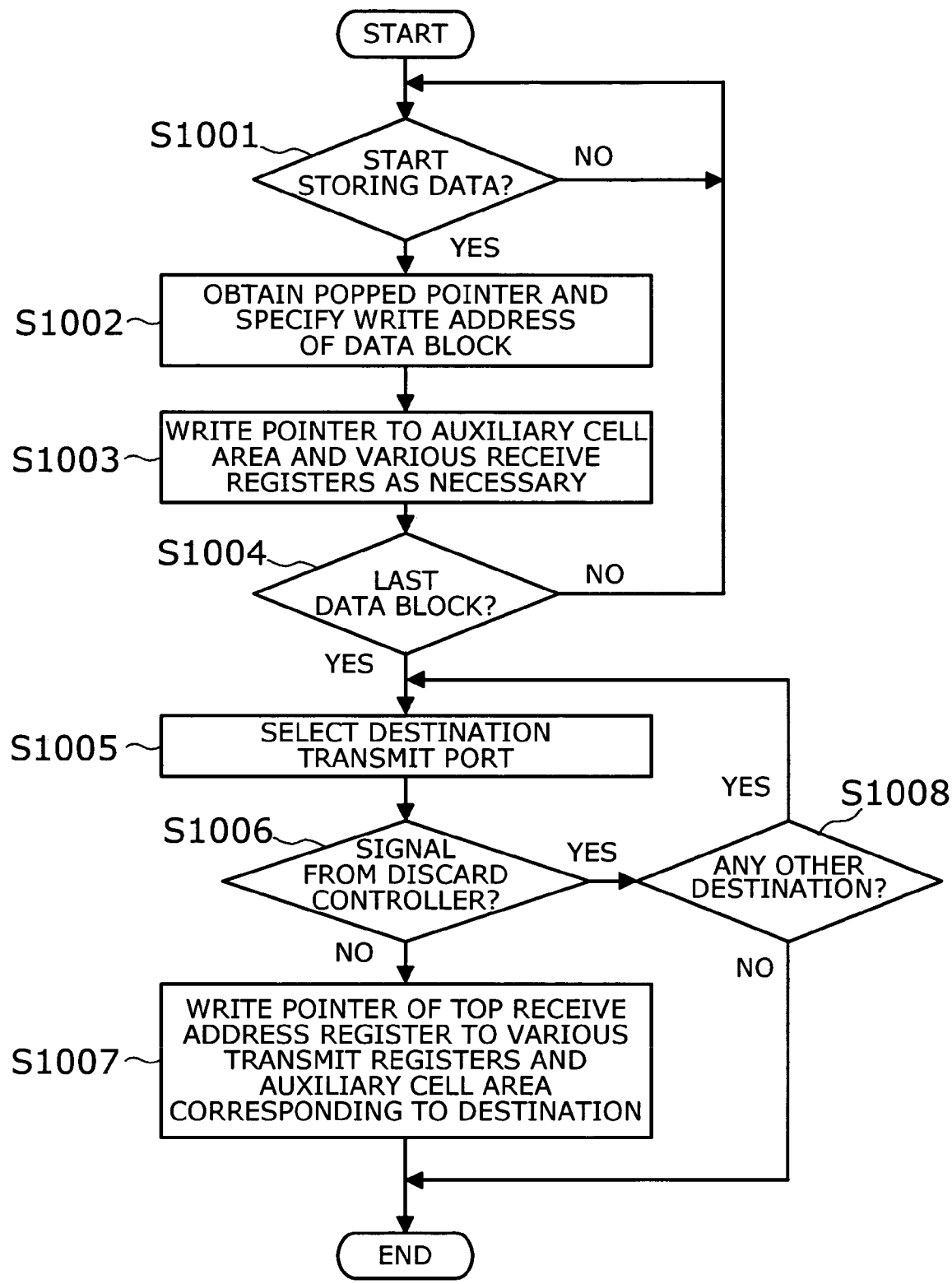
FIG. 10 is a flowchart of a process executed by the read/write controller in receiving packets according to the first linked list management.
Figure 11:
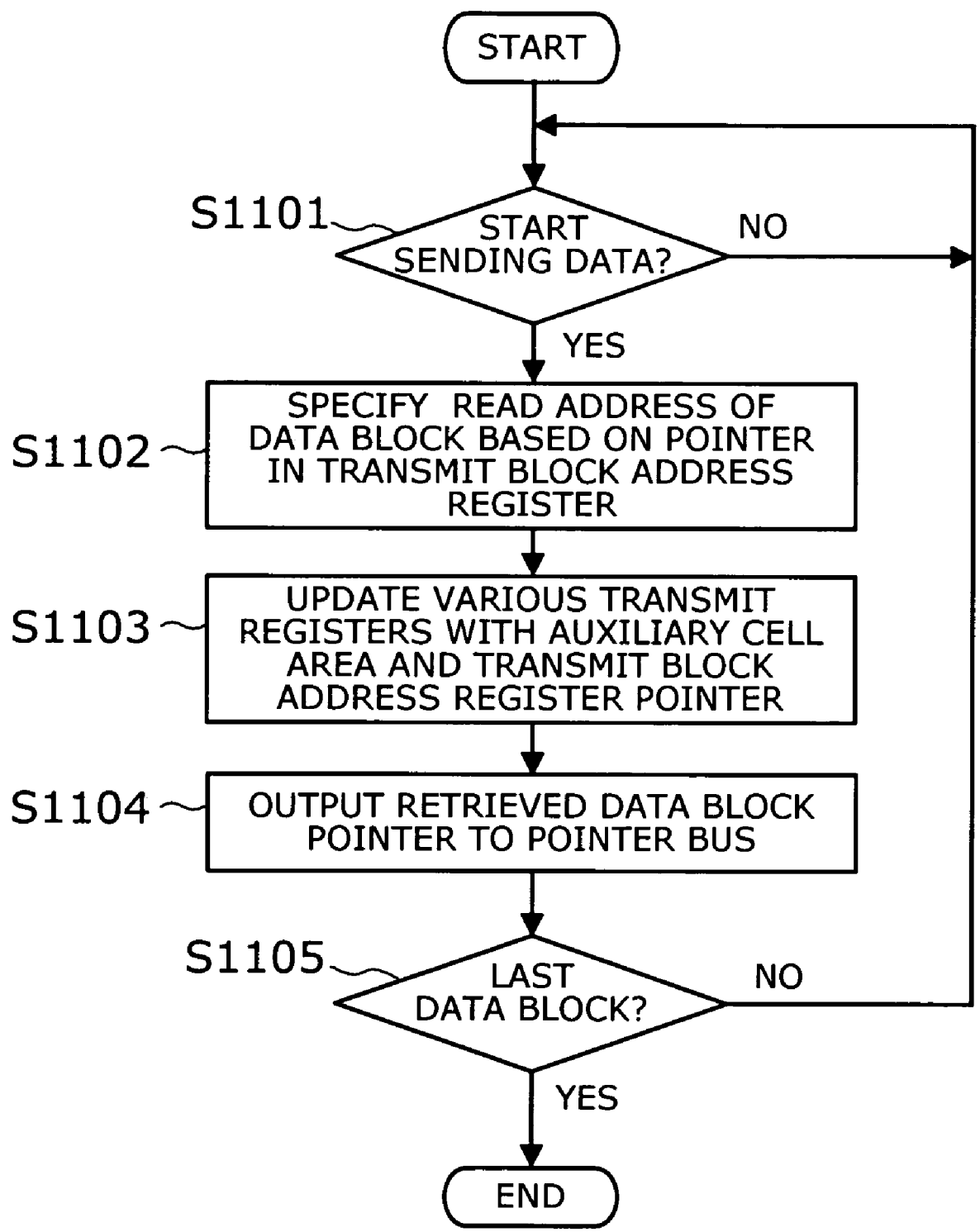
FIG. 11 is a flowchart of a process executed by the read/write controller in transmitting packets according to the first linked list management.

Referring now to the flowcharts of FIGS. 10 and 11, the following will describe how the read/write controller 140 uses the above registers, together with the information stored in the auxiliary cell area 133a of each data block. Some other elements in the network switching device 100 will also be explained as necessary.

FIG. 10 is a flowchart of a process executed by the read/write controller 140 when it receives packets. This process includes the following steps:

(Step S1001) When a packet has arrived at, for example, the transmit/receive interface 111, the data transfer circuit 120 is notified of the reception of this packet. If the data transfer circuit 120 acknowledges this request, the read/write controller 140 proceeds to the step S1002, as it starts to store data blocks to the shared buffer 130.

(Step S1002) A pointer is popped from the pointer stack 150 and placed on the pointer bus 180. The read/write controller 140 obtains this pointer and, based on its content, specifies the write address of the data block in the shared buffer 130. The data block is thus stored in the shared buffer 130.

(Step S1003) The read/write controller 140 writes the pointer obtained at step S1002 to the auxiliary cell area 133a, top receive address register 141a, and last receive address register 142a.

(S1003-1) In the case where the data block that has just been entered to the shared buffer 130 is the top data block of the packet, the pointer is set to the top receive address register 141a and last receive address register 142a corresponding to the receive port.

(S1003-2) In the case where the data block of interest is neither the top data block nor the last data block, the read/write controller 140 refers to the pointer set in the last receive address register 142a. This pointer indicates the write address of the immediately preceding data block. The read/write controller 140 writes the pointer obtained at step S1002 to the auxiliary cell area 133a of that data block, thereby linking the newly stored data block with the preceding data block in the same packet. The read/write controller 140 also updates the last receive address register 142a with the pointer obtained at step S1002.

(S1003-3) In the case where the data block of interest is the last data block of the present packet, the read/write controller 140 refers to the pointer set in the last receive address register 142a. This pointer points to the immediately preceding data block, and the read/write controller 140 writes the pointer obtained at step S1002 in the auxiliary cell area 133a of that data block so as to establish a linkage with it. For the data block of interest (i.e., the last block of the present packet), its auxiliary cell area 133a is filled in with a piece of information indicating that there is no more data block to follow.

(Step S1004) According to the negotiation between the data transfer circuit and receive/transmit interface of interest, the read/write controller 140 recognizes whether the data block being processed is the last data block of the packet. If not, the process returns to step S1001 to wait until the next data block comes. If it is the last data block, the process advances to step S1005.

By repeating the above steps S1001 to S1004, the read/write controller 140 enters all data blocks of the present packet to the shared buffer 130. As a result, the location of the top data block is set to the top receive address register 141a, and the location of the last data block or of the immediately preceding data block is set to the last receive address register 142a.

What the read/write controller 140 executes at steps S1001 to S1004 are associated with what the pop controller 161 performs at steps S601 to S605 of FIG. 6. That is, the receive pointer buffer 171a maintains the pointers used at steps S1001 to S1004, as well as their number.

The above steps of FIG. 10 are immediately followed by a process of registering the received packet with a relevant transmit queue.

(Step S1005) The read/write controller 140 selects a destination transmit port according to the given interface description. Suppose now that the network 22 is selected as a destination network. At this step, the count value of the receive pointer buffer 171a is added to the transmit queue pointer counter 173b corresponding to the selected destination.

(Step S1006) If the transmit queue pointer counter 173b exceeds its upper limit, and if there is no other destination, the discard controller 163 sends a control signal to the read/write controller 140. This control signal causes the read/write controller 140 to proceed to step S1008. Otherwise, the process advances to step S1007.

(Step S1007) The read/write controller 140 initiates a process of registering the received packet with a transmit queue corresponding to the selected destination. More specifically, it looks into a next outgoing packet address register 146b corresponding to the selected transmit port to determine whether this register contains valid data. By so doing, the read/write controller 140 determines whether the destination transmit queue has any pending packets to send. After that, the read/write controller 140 appends the received packet to the transmit queue by transferring its pointer from the top receive address register 141a to various transmit registers and auxiliary cell areas. This step is executed in two ways depending on the current content of the next outgoing packet address register 146b examined above.

(S1007-1) In the case where the transmit queue corresponding to the selected destination contains a pending packet, the read/write controller 140 first extracts the pointer of the received packet from the top receive address register 141a. It then consults another pointer in the last transmit address register 145b corresponding to the destination so as to locate the top data block of the last registered packet in the transmit queue. The pointer of the received packet is now written into the auxiliary cell area 133a of that top data block of the last registered packet. Actually, the auxiliary cell area 133a of that top data block will have two pointers: one pointing to the next data block within the same packet, and the other pointing to the top data block of the next packet. The latter pointer provides linkage from the top data block of the immediately preceding packet to the newly registered packet in the transmit queue. In addition, the read/write controller 140 transfers a pointer from the top receive address register 141a to the last transmit address register 145b. This action updates the pointer that indicates the top of the last packet in the selected transmit queue.

(S1007-2) In the case where no pending packets are found in the transmit queue corresponding to the selected destination, the read/write controller 140 transfers a pointer from the top receive address register 141a to the sent packet address register 143b, transmit block address register 144b, last transmit address register 145b, and next outgoing packet address register 146b corresponding to the destination. This pointer allows the read/write controller 140 to identify which packet to read in advance from the transmit queue.

(Step S1008) Now that a control signal from the discard controller 163 has been received at step S1006, the read/write controller 140 consults the given interface description to determine whether the present packet has any other destination. If it has, the process returns to step S1005 to select another transmit port for transmission to the new destination.

The above processing steps adds a new outgoing packet to its relevant transmit queue in the shared buffer 130. Unless the packet is discarded due to overflow of the transmit queue, a linked list structure of pointers is established to manage the data blocks in this transmit queue. Now following this linked list structure of pointers, the read/write controller 140 reads data blocks out of the transmit queue for transmission to their destination network.

FIG. 11 is a flowchart of a process executed by the read/write controller 140 to transmit packets. This process includes the following steps:

(Step S1101) Suppose, for example, that there is a packet addressed to the network 22. When a transmit request is received from the transmit/receive interface 112 corresponding to the destination, and the data transfer circuit 120 acknowledges this request, the read/write controller 140 proceeds to step S1102, recognizing that a process has started to read data blocks out of the shared buffer 130.

(Step S1102) Based on the pointer in a transmit block address register 144b corresponding to the destination transmit port, the read/write controller 140 determines which address to read. From this address of the shared buffer 130, the top data block and its auxiliary cell area 133a are read out of the transmit queue. The data block is then passed to the transmit/receive interface 112 with the assistance of the data transfer circuit 120.

(Step S1103) The auxiliary cell area 133a read at step S1102 contains a pointer. Using this pointer, along with the pointer in the transmit block address register 144b, the read/write controller 140 updates pointers stored in the transmit block address register 144b and next outgoing packet address register 146b. Actually, this step S1103 is executed in three ways depending on the location of the data block to be sent out.

(S1103-1) In the case where the data block read at step S1102 is the top data block, and where its auxiliary cell area 133a has a valid pointer to a succeeding packet (i.e., the pointer stored at step S1007-1 explained in FIG. 10), the read/write controller 140 stores that pointer into the next outgoing packet address register 146b. This pointer enables the read/write controller 140 to identify the top address of a succeeding packet, if any, in the same transmit queue.

(S1103-2) In the case where the data block read at step S1102 is not the last data block, the auxiliary cell area 133a should contain a pointer to the next data block. The read/write controller 140 then sets this pointer to the transmit block address register 144b.

(S1103-3) In the case where the data block read at step S1102 is the last data block, the read/write controller 140 transfers a pointer from the next outgoing packet address register 146b to the transmit block address register 144b and the sent packet address register 143b.

(Step S1104) The read/write controller 140 places the pointer used at step S1102 on the pointer bus 180. This action corresponds to step S702 of FIG. 7. That is, the placed pointer is stored in the relevant transmit pointer buffer 172b, thus causing an increase in its count value, as well as a decrease in the corresponding transmit queue pointer counter 173a.

(Step S1105) The read/write controller 140 determines whether the data block read at step S1102 is the last block of the present packet. If not, the process returns to step S1101 to wait for the beginning of transmission of the next data block. The above steps S1101 to S1105 are repeated until all data blocks of the present packet are read out, and the process is thus terminated.

As a result of the above processing, all the pointers used to read out one packet are stored in the transmit pointer buffer 172b, the count value of which indicates the number of those pointers. The count value of the transmit queue pointer counter 173b, on the other hand, has been decreased by the same number.

While FIG. 11 omits it, the process may involve some more iterations to transmit the same packet to other specified destinations, if any. This case occurs when the interface description includes other destination transmit ports. The read/write controller 140 then selects one of those transmit port and adds the packet to a transmit queue corresponding to the selected port. The transmit queue pointer counter associated with this transmit queue now gains the count value of the transmit pointer buffer 172b, and the transmit queue accepts the new packet only if the resulting new count is within a predetermined limit. For packet registration, the pointer in the sent packet address register 143b is extracted, as is the top data block of the last packet from the newly selected transmit queue. The extracted pointer is then stored in the auxiliary cell area 133a of that top data block. The new packet is linked to the last pending packet in this way.

The first linked list management method uses the linked data structure described above, in which each data block in the shared buffer 130 has an auxiliary cell area 133a for storing a pointer to the next data block, as well as a pointer to the top of the next packet. This data structure provides the linkage between data blocks in a packet, along with that between packets in a transmit queue. To control the process of registering packets with a transmit queue and reading data blocks from the transmit queue, the proposed method uses six kinds of registers disposed for each receive port and transmit port. The present invention thus enables efficient management of read and write operations on a shared buffer 130 without increasing the costs.

Second Linked List Management

Figure 12:
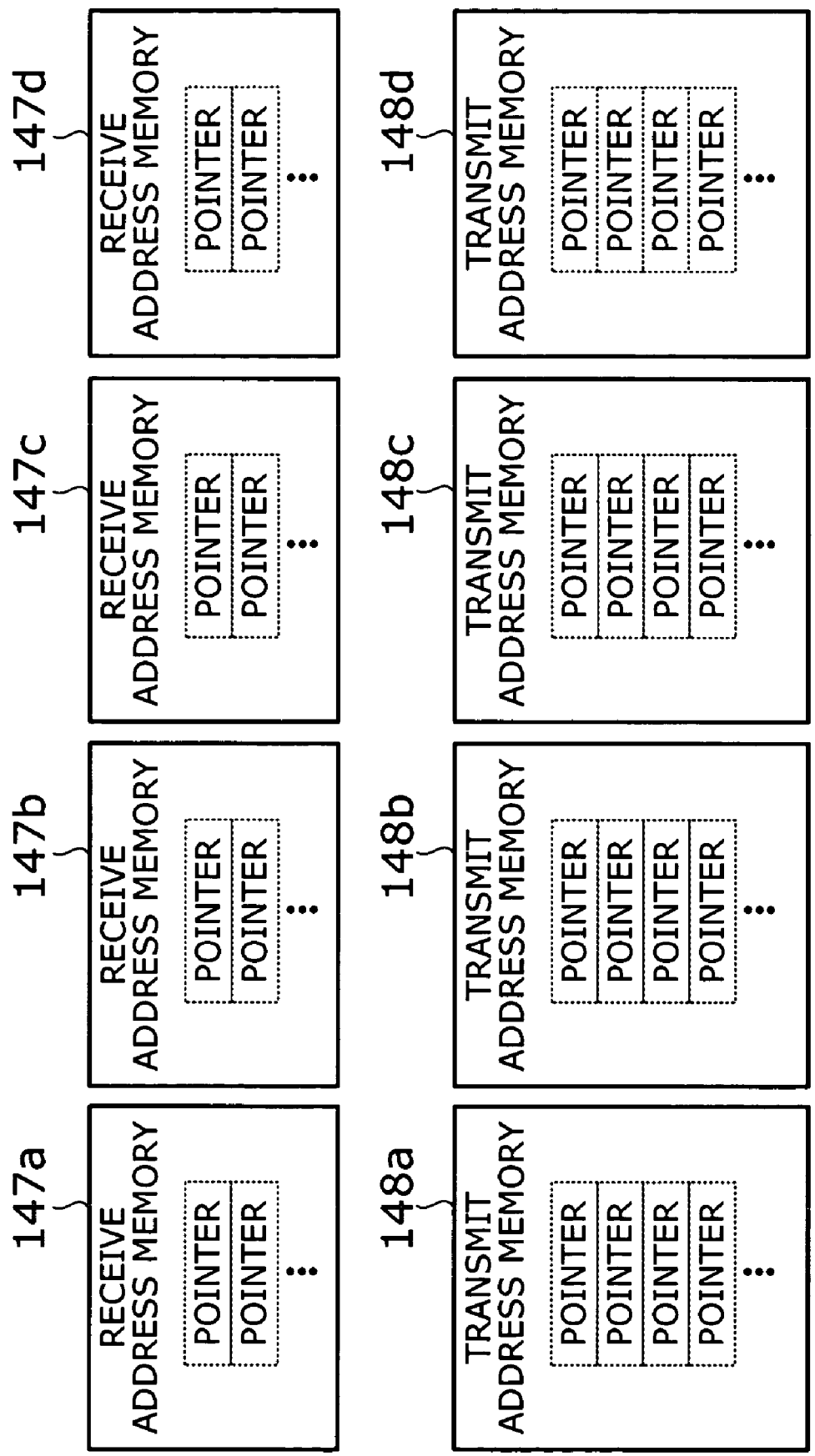
FIG. 12 shows the structure of an array of memories in the read/write controller according to a second linked list management.

According to a second linked list management method, the read/write controller 140 has a dedicated memory area for each receive port and each transmit port to store a series of pointers that specify the data block addresses. FIG. 12 shows the structure of a memory array that the read/write controller 140 has for managing the linkage between data blocks.

As can be seen from FIG. 12, the read/write controller 140 employs a plurality of receive address memories 147a to 147d corresponding to different receive ports and a plurality of transmit address memories 148a to 148d corresponding to different transmit ports.

Each receive address memory 147a to 147d (also referred to as a "receive block location memory" where appropriate) stores a series of pointers that point to subsequent data blocks of a received packet when they are entered to the shared buffer 130. Each transmit address memory 148a to 148d (also referred to as a "transmit block location memory" where appropriate) stores a series of pointers that point the subsequent data blocks of an outgoing packet when that packet is registered with a transmit queue. Those memories are controlled in a first-in first-out fashion in storing and retrieving pointers.

Figure 13:
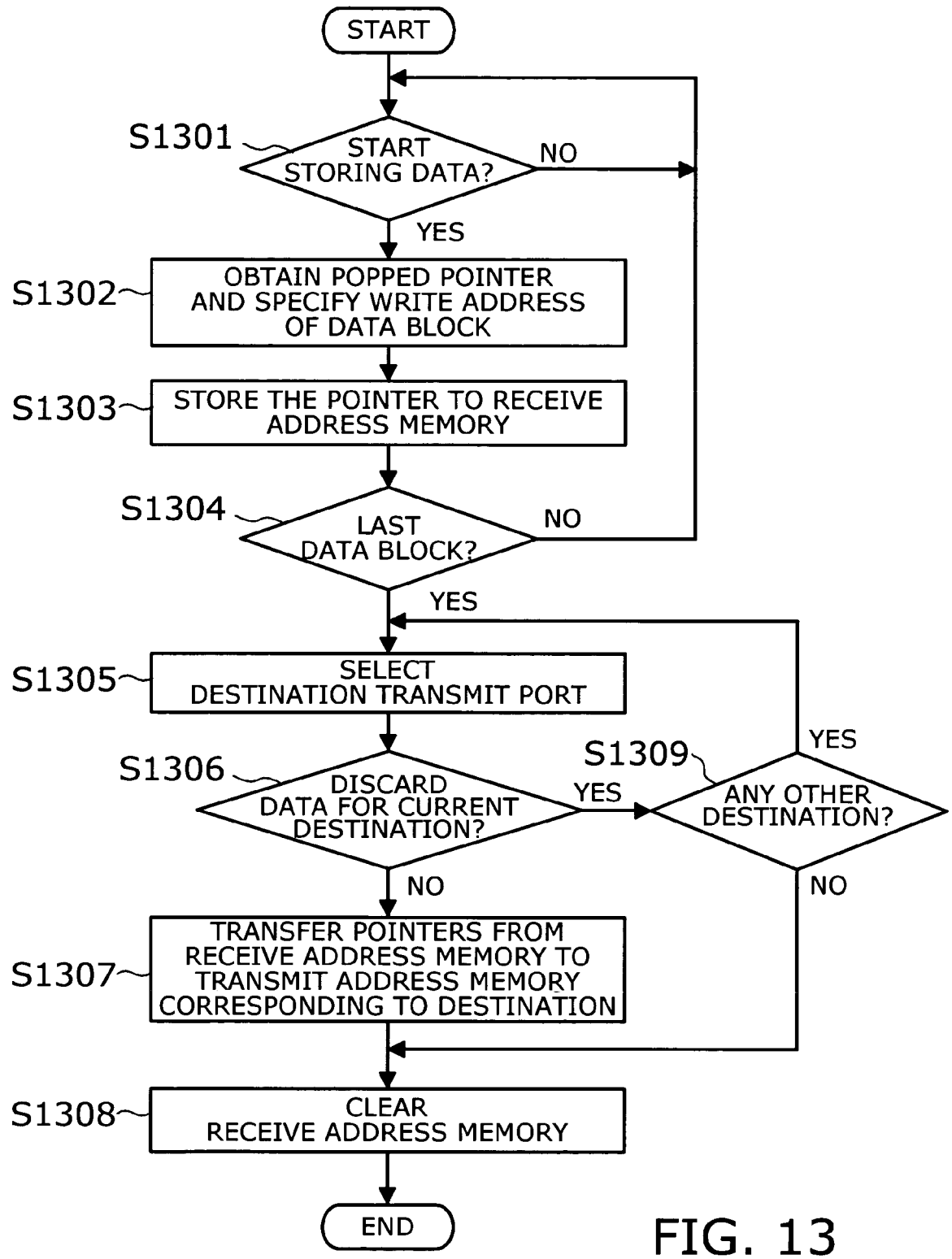
FIG. 13 is a flowchart of a process executed by the read/write controller in receiving packets according to the second linked list management.
Figure 14:
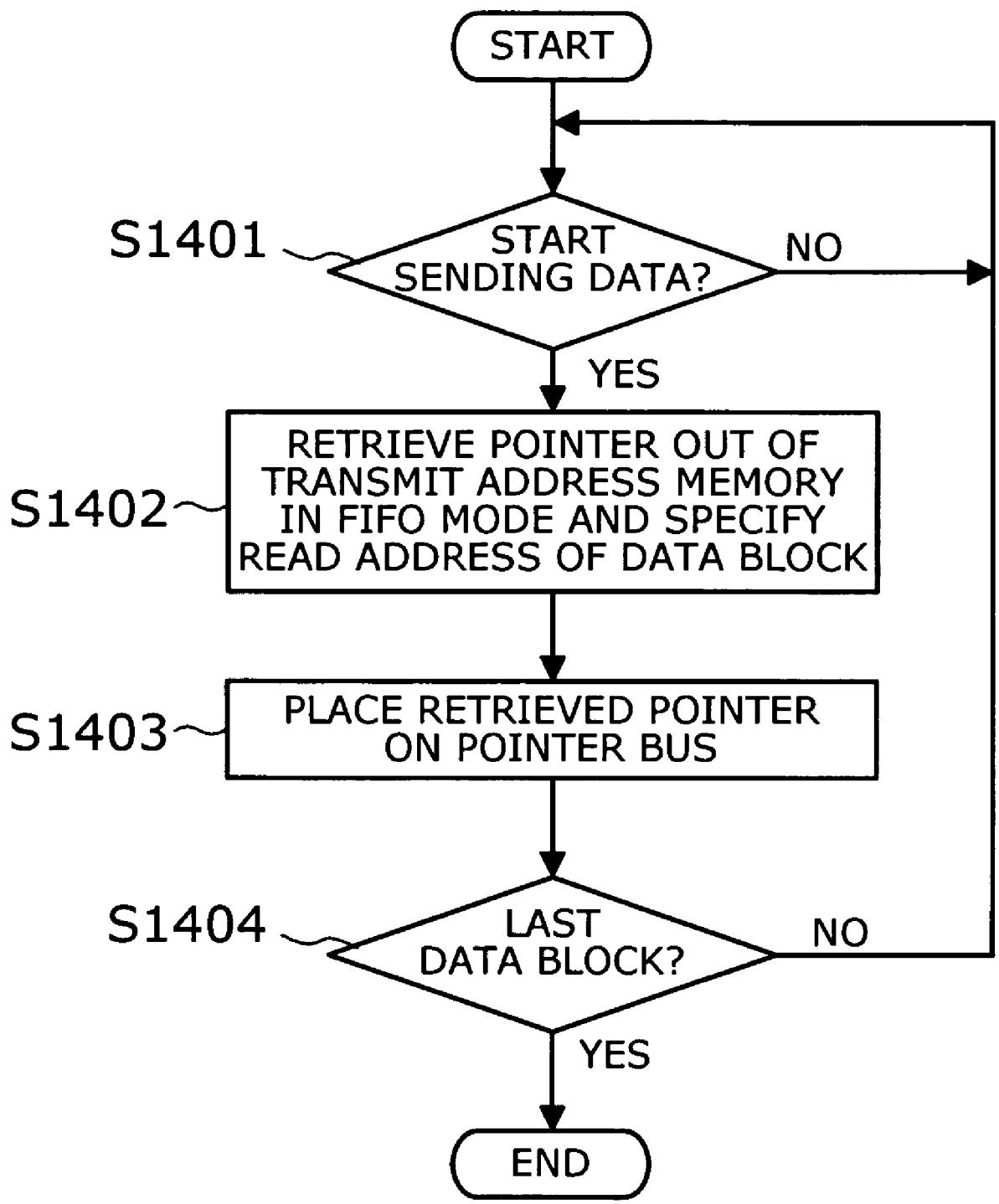
FIG. 14 is a flowchart of a process executed by the read/write controller in transmitting packets according to the second linked list management.
Figure 15:
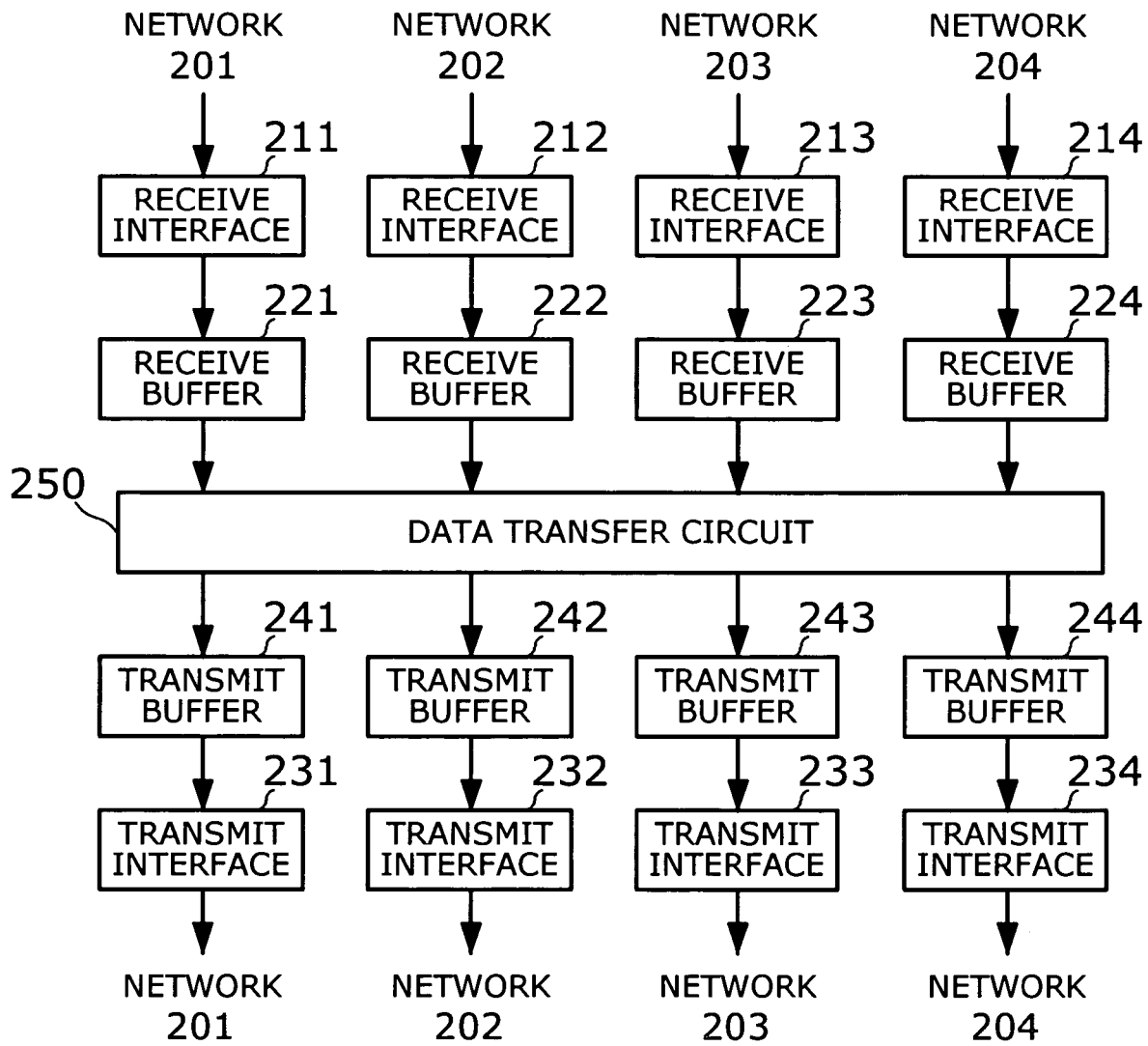
FIG. 15 shows an example of a conventional network switching device with multiple buffers.
Figure 16:
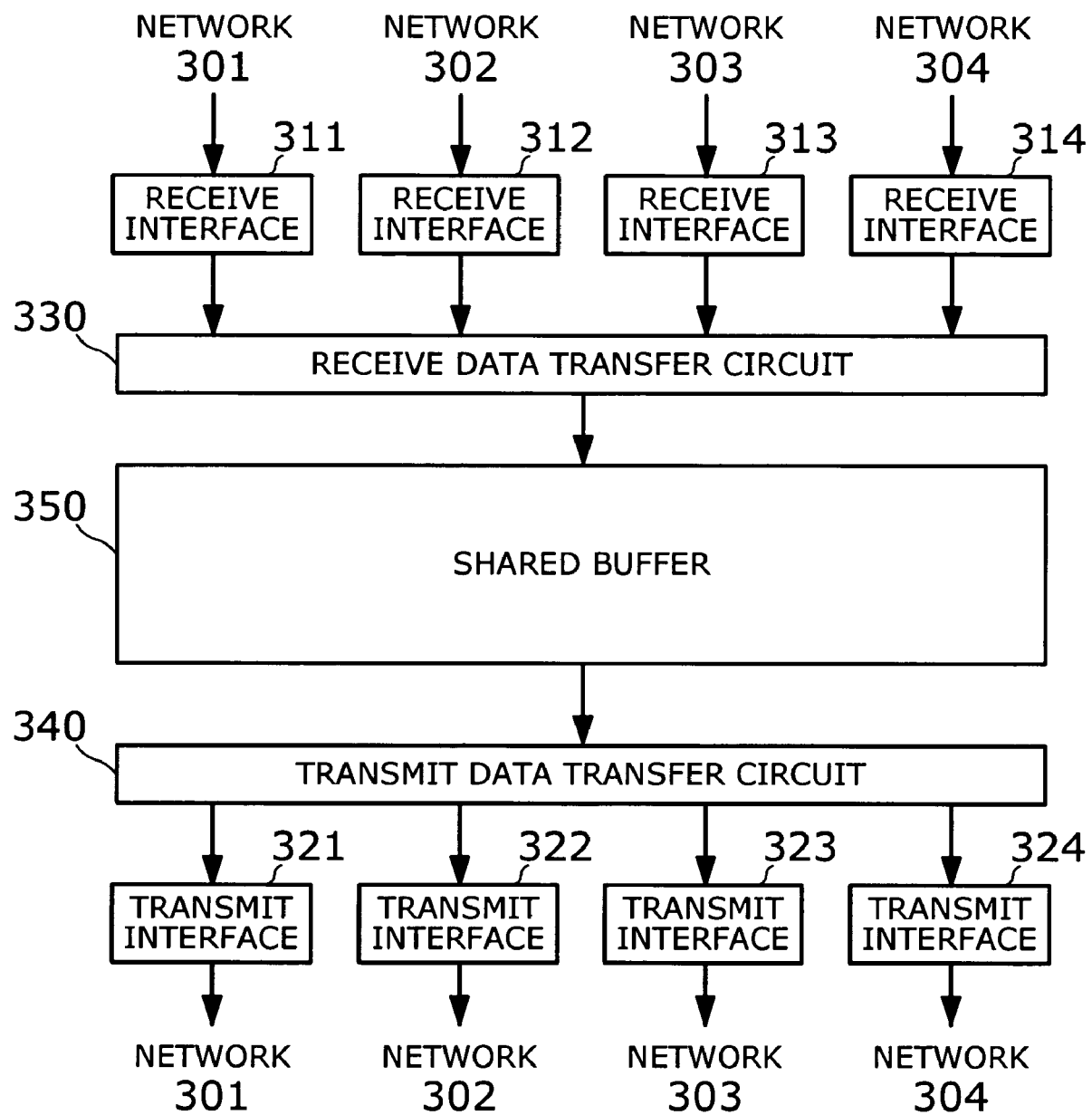
FIG. 16 shows an example of a conventional network switching device with a shared buffer.

Referring now to the flowcharts of FIGS. 13 and 14, the following will describe how the read/write controller 140 uses the above-described memories. Some other elements in the network switching device 100 will also be explained as necessary.

FIG. 13 is a flowchart of a process executed by the read/write controller 140 when it receives packets. The process includes the following steps:

(Steps S1301 and S1302) These two steps are identical to steps S1001 and S1002 of FIG. 10, respectively. That is, when a packet has arrived at, for example, the transmit/receive interface 111, the data transfer circuit 120 is notified of the reception of this packet. If the data transfer circuit 120 acknowledges the transfer of the packet to the shared buffer 130, the read/write controller 140 obtains a pointer from the pointer stack 150 to provide a write address for a data block. The data block is stored into the specified address of the shared buffer 130 accordingly.

(Step S1303) The read/write controller 140 saves the obtained pointer in a receive address memory 147a corresponding to the receive port, where the receive address memory 147a operates in FIFO mode.

(Step S1304) The receive interface sends a signal as to whether the data block stored at step S1302 is the last data block of the received packet. If not, the process returns to step S1301. By repeating the above steps S1301 to S1304, the read/write controller 140 enters all data blocks of the present packet to the shared buffer 130. Simultaneously the receive address memory 147a receives a series of pointers used to store the data blocks, thus establishing linkage between the stored packet data blocks. The stored packet will now be registered with a transmit queue corresponding to, for example, the destination network 22.

(Step S1305) The read/write controller 140 selects a destination transmit port. At this step, the count value of the receive address memory 147a is added to the transmit queue pointer counter 173b corresponding to the selected destination.

(Step S1306) The addition at step S1305 could result in an excessive count value over the predetermined upper limit, thus causing the discard controller 163 to send a control signal to the read/write controller 140. If this is the case, the process proceeds to step S1309. If not, the process advances to step S1307.

(Step S1307) The read/write controller 140 transfers pointers from the receive address memory 147*a* to a transmit address memory 148*b* corresponding to the selected destination in FIFO mode. This action creates a linkage between packets in the transmit queue for the selected destination.

(Step S1308) The read/write controller 140 clears the receive address memory 147*a*, thus terminating the present process.

(Step S1309) The read/write controller 140 determines whether the packet has any other specified destination. If it has, the process returns step S1305 to select a new transmit port. If not, then the process proceeds to step S1308, thus returning pointers from the receive address memory 147*a* to the pointer stack 150.

FIG. 14 is a flowchart of a process executed by the read/write controller 140 when it transmits packets. The process includes the following steps:

(Step S1401) Suppose, for example, that there is a packet addressed to the network 22. Similar to step S1101 of FIG. 11, if the data transfer circuit 120 acknowledges a transmit request from the transmit/receive interface 112, it assists the transfer of packets from the shared buffer 130, and the read/write controller 140 proceeds to step S1402, recognizing that a process has started to read data blocks out of the shared buffer 130.

(Step S1402) The read/write controller 140 retrieves a pointer in a FIFO fashion from a transmit address memory 148*b* corresponding to the destination transmit port, and based on that pointer, it determines which address to read. From the determined address of the shared buffer 130, the top data block is read out of the relevant transmit queue. The data block is then passed to the transmit/receive interface 112 with the assistance of the data transfer circuit 120.

(Step S1403) The read/write controller 140 places the retrieved pointer on the pointer bus 180. The pointer is transferred to a relevant transmit pointer buffer 172*b*, which causes an increase of its count value, while decreasing a corresponding transmit address memory.

(Step S1404) The read/write controller 140 determines whether the data block read at step S1402 is the last data block of the packet. If it is not, the process returns to step S1401, and after that, the steps S1401 to S1404 are repeated until all the data blocks are read.

As a result of the above processing, all the pointers used to read out one packet are stored in the transmit pointer buffer 172*b*, the count value of which indicates the number of those pointers, as in the case of FIG. 11. The count value of the transmit address memory 173*b*, on the other hand, has been decreased by the same number.

While FIG. 14 omits it, the process may involve some more iterations to transmit the same packet to other specified destinations, if any. This case occurs when the interface description includes other destination transmit ports. The read/write controller 140 then selects one of those transmit port and adds the packet to a transmit queue corresponding to the selected port. The transmit queue may or may not accept a new packet, depending on the count value of a relevant transmit address memory, as well as on whether the discard signal is asserted with regard to a relevant destination port.

To register a packet, the read/write controller 140 receives pointers from, for example, the transmit pointer buffer 172*b* via the pointer bus 180 and stores them to a transmit address register corresponding to the newly selected transmit queue. A packet can be appended in this way to the newly selected transmit queue.

The first linked list management method uses the linked data structure described above, in which the pointers used in writing data blocks are stored successively in a memory. In retrieving those data blocks, their corresponding pointers are read out the memory to identify the address of each block. In this way, the proposed method enables efficient management of the linkage between data blocks of each packet, as well as that between packets in each transmit queue.

Compared with the first management method, the second management method is more simple in storing pointers that are currently used. On the other hand, the second method requires a larger memory space to accommodate as many pointers as the number of data blocks to be entered to the shared buffer 130, unlike the register array used in the first management method. This would lead to an increased component cost and a larger area for mounting memory.

CONCLUSION

To summarize the above explanation, the present invention provides a network switching device which creates transmit queues to store up to a fixed number of data blocks for each destination network and registers each received packet with one of the transmit queues that corresponds to its specified destination. This structure of the device prevents its buffer from blocking, although the device uses a shared buffer architecture. Furthermore, each received packet is divided into one or more fixed-length data blocks for storage in the buffer, and the linkage between such data blocks in each packet and that between packets in each transmit queue are managed as a linked list structure based on the locations of data blocks in the buffer. This feature of the invention enables more efficient use of buffer space.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network switching device that transfers variable-length packets between a plurality of networks, the device comprising:
   a buffer for shared use as data storage areas for both incoming packets and outgoing packets;
   a packet divider that divides a received packet into one or more data blocks with a fixed length and supplies the divided data blocks to said buffer; and
   a buffer controller that creates a transmit queue for each destination network to store up to a fixed number of data blocks, registers the received packet with one of the transmit queues that corresponds to a given destination of the received packet after writing the divided data blocks into said buffer, and manages linkage between the data blocks in each packet, as well as linkage between packets in each transmit queue, as a linked list structure based on locations of data blocks in said buffer;
   wherein said buffer controller comprises:
   a pointer stack storing pointers in a unified manner, the pointers indicating the locations of the data blocks in said buffer;

a receive pointer buffer disposed for each source network to receive pointers obtained from said pointer stack, as well as to count the number of pointers that are received;

a transmit queue pointer counter disposed for each destination network to count the number of pointers corresponding to the data blocks that are registered with the corresponding transmit queue; and a transmit pointer buffer disposed for each destination network to receive pointers used in transmitting a packet from the corresponding transmit queue, as well as to count the number of pointers that are received.

2. The network switching device according to claim 1, wherein said buffer controller reads out the data blocks registered with the transmit queue, according to the linked list structure.

3. The network switching device according to claim 1, wherein said buffer controller discards the packet that includes the data blocks in process of registration once the number of data blocks registered in the transmit queue exceeds a predetermined upper limit.

4. The network switching device according to claim 1, wherein said buffer controller creates a receive queue for each source network to store up to a given maximum number of data blocks per packet and, upon completion of registering the data blocks of the received packet with one of the receive queues, establishes linkage from said one of the receive queues to one of the transmit queues that corresponds to the given destination of the received packet.

5. The network switching device according to claim 1, wherein
said buffer controller adds the count value of the receive pointer buffer relevant to the received packet to the transmit queue pointer counter corresponding to the destination of the packet, when registering the packet with the corresponding transmit queue; and
said buffer controller decreases said corresponding transmit queue pointer counter, while increasing said corresponding transmit pointer buffer, upon transmission of the packet out of the corresponding transmit queue.

6. The network switching device according to claim 5, wherein said buffer controller pushes the pointers back onto said pointer stack after transmitting the packet read out of said one of the transmit queues.

7. The network switching device according to claim 5, wherein:
the packet being transmitted is also addressed to another destination network; and
said buffer controller adds the count value of the transmit pointer buffer relevant to said one of the transmit queues to the transmit queue pointer counter corresponding to said another destination network of the packet, after the packet is transmitted from said one of the transmit queues.

8. The network switching device according to claim 5, wherein said buffer controller discards the packet in process of registration, as well as pushing the pointers from said relevant receive pointer buffer back onto said pointer stack, once said corresponding transmit queue pointer counter exceeds a set limit when said buffer controller attempts to register the received packet with said one of the transmit queues.

9. The network switching device according to claim 1, wherein said buffer controller writes auxiliary data, together with each data block, into said buffer, the auxiliary data including a pointer indicating the location of a succeeding data block within each packet.

10. The network switching device according to claim 9, wherein said buffer controller registers a plurality of packets with said transmit queue by writing another pointer as part of the auxiliary data attached to the top data block of a preceding packet so as to indicate a location of the top data block of a succeeding packet.

11. The network switching device according to claim 10, wherein said buffer controller further comprises:
a next outgoing packet address register containing a pointer to the top data block of a packet to be transmitted next, of those registered in each of the transmit queues; and
a transmit block address register containing a pointer to a data block to be transmitted next, of those registered in each of the transmit queues;
and wherein said buffer controller consults said next outgoing packet address register and to transmit block address register in specifying read addresses of data blocks in said buffer.

12. The network switching device according to claim 11, wherein:
each time a new data block is read out of the transmit queues, said buffer controller updates said transmit block address register according to the auxiliary data accompanying that new data block; and
each time a new packet is read out of the transmit queues, said buffer controller updates said next outgoing packet address register according to the auxiliary data accompanying the top data block of that new packet.

13. The network switching device according to claim 1, wherein said buffer controller further comprises:
a transmit block location memory for each destination network to store the pointers indicating locations of data blocks in each transmit queue;
and wherein said buffer controller consults said transmit block location memory in specifying read addresses of data blocks in said buffer.

14. The network switching device according to claim 13, wherein said buffer controller further comprises:
a receive block location memory to store a series of pointers indicating where data blocks of the received packet have been written in said buffer;
and wherein said buffer controller registers the received packet with the corresponding transmit queue by transferring the pointers from said receive block location memory to the transmit block location memory corresponding to the transmit queue.

15. The network switching device according to claim 1, wherein said buffer controller determines a write address of each data block according to one of the pointers supplied from said pointer stack, and writes each data block into said buffer, together with auxiliary data including the pointer indicating the location of a succeeding data block in the same packet.

16. The network switching device according to claim 15, wherein said buffer controller registers a plurality of packets with said transmit queue by writing another pointer as part of the auxiliary data attached to the top data block of a preceding packet so as to indicate a location of the top data block of a succeeding packet.

17. The network switching device according to claim 16, wherein said buffer controller further comprises:
a next outgoing packet address register to contain a pointer to the top data block of a packet to be transmitted next, of those registered in each of the transmit queues; and
a transmit block address register to contain a pointer to a data block to be transmitted next, of those registered in each of the transmit queues;

and wherein said buffer controller consults said next outgoing packet address register and transmit block address register in specifying read addresses of data blocks in said buffer.

18. The network switching device according to claim 17, wherein:

each time a new data block is read out of the transmit queues, said buffer controller updates said transmit block address register according to the auxiliary data accompanying that new data block; and each time a new packet is read out of the transmit queues, said buffer controller updates said next outgoing packet address register according to the auxiliary data accompanying the top data block of that new packet.

19. A network switching method for transferring variable-length packets between a plurality of networks by using a buffer to store and forward the packets, comprising:

dividing a packet into one or more data blocks with a fixed length for storage in the buffer;

creating, by a buffer controller, a transmit queue for each destination network to store up to a fixed number of data blocks;

registering the packet with one of the transmit queues that corresponds to a given destination of the packet after the divided data blocks are written into the buffer;

managing linkage between the data blocks within each packet, as well as linkage between packets in each transmit queue, as a linked list structure based on locations of data blocks in the buffer;

storing pointers into a pointer stack in a unified manner, the pointers indicating the locations of the data blocks in said buffer;

receiving pointers obtained from said pointer stack at a receive pointer buffer disposed for each source network and counting the number of pointers that are received;

counting the number of pointers corresponding to the data blocks that are registered with the corresponding transmit queue; and receiving pointers used in transmitting a packet from the corresponding transmit queue at a transmit pointer buffer disposed for each destination network and counting the number of pointers that are received.

20. The network switching device according to claim 1, wherein said buffer controller to obtain one of the pointers from said pointer stack when writing each data block to said buffer; and said buffer controller to manage the linkage between the data blocks within each packet and the linkage between packets in each transmit queue by using the obtained pointers.

* * * * *